United States Patent
Yoshihara

(10) Patent No.: US 9,761,075 B2
(45) Date of Patent: Sep. 12, 2017

(54) SMART KEY SYSTEM

(71) Applicant: TOYOTA JIDOSHA KABUSHIKI KAISHA, Toyota-shi, Aichi-ken (JP)

(72) Inventor: Toru Yoshihara, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/229,806

(22) Filed: Aug. 5, 2016

(65) Prior Publication Data

US 2017/0076524 A1 Mar. 16, 2017

(30) Foreign Application Priority Data

Sep. 16, 2015 (JP) ................................. 2015-183347

(51) Int. Cl.
*G07C 9/00* (2006.01)
*H04L 12/40* (2006.01)
(Continued)

(52) U.S. Cl.
CPC .......... *G07C 9/00309* (2013.01); *B60R 16/02* (2013.01); *B60R 25/00* (2013.01);
(Continued)

(58) Field of Classification Search
CPC ...... G07C 9/00309; G07C 2009/00769; G07C 5/008; G07C 5/0808; G07C 5/085; G07C 9/00111; G07C 9/00896; G07C 11/00; G07C 2009/00277; G07C 2009/00412; G07C 2009/00793; G07C 2009/00888; G07C 2205/02; G07C 2209/02;
(Continued)

(56) References Cited

U.S. PATENT DOCUMENTS 6,617,961 B1 * 9/2003 Janssen ................. B60R 25/245
307/10.1
8,102,241 B2 1/2012 Okada et al.
(Continued)

FOREIGN PATENT DOCUMENTS

JP 2007-153190 A 6/2007
JP 2012-054662 A 3/2012
JP 2013-100717 A 5/2013

*Primary Examiner* — Dionne H Pendleton
(74) *Attorney, Agent, or Firm* — Oliff PLC

(57) ABSTRACT

A smart key system to prevent theft of a vehicle by a relay attack while securing communication performance under a noisy environment, includes an in-vehicle device that measures noise in a radio wave band of a response signal to be wirelessly transmitted by a mobile device; sets a transmission strength of the response signal greater while the noise becomes greater, within a predetermined strength; wirelessly transmits a request signal including a command about the transmission strength into a predetermined area; receives the response signal; and authenticates the mobile device, by first information preregistered for the mobile device, and second information included in the response signal. The mobile device receives the request signal; sets the transmission strength of the response signal, based on the command in the request signal; and wirelessly transmits the response signal including the second information by the set transmission strength when receiving the request signal.

2 Claims, 12 Drawing Sheets

(51) Int. Cl.
*B60R 25/00* (2013.01)
*B60R 16/02* (2006.01)
(52) U.S. Cl.
CPC .............. *G07C 2009/00769* (2013.01); *G07C 2209/63* (2013.01)
(58) Field of Classification Search
CPC ... G07C 3/00; G07C 5/02; G07C 5/08; G07C 5/0825; G07C 9/00007; G07C 9/00015; G07C 9/00182; G07C 9/00563; G07C 9/00658; G07C 2009/63; G07C 2009/00373; G07C 2009/00523; G06K 7/087; G06K 7/1417; G06K 9/00288; G06K 9/00335; G06K 9/00442; G06K 9/186; G06K 9/36; G06K 19/06037; G06K 7/10712; B60R 25/00; B60R 25/245; H04L 12/40; H04L 2012/40215
See application file for complete search history.

(56) References Cited

U.S. PATENT DOCUMENTS

| | | | |
|---|---|---|---|
| 2014/0320262 A1 | 10/2014 | Park | |
| 2015/0279138 A1* | 10/2015 | Nagai | B60R 25/24 340/5.72 |
| 2016/0275732 A1* | 9/2016 | Tomita | G07C 9/00182 |

\* cited by examiner

FIG.2

| Wake Burst | Start | Authentication command | Information about transmission strength command |
|---|---|---|---| ced
SMART KEY SYSTEM

FIELD

The following disclosure relates to a smart key system.

BACKGROUND

Conventionally, smart key systems have been known. In a smart key system, when a user holding a mobile device (a smart key) performs a predetermined operation, for example, contacts a touch sensor on a door handle, or presses an engine start button, an in-vehicle device wirelessly transmits a request signal into the vehicle compartment or a limited area out of the vehicle compartment. Then, the in-vehicle device receives a response signal wirelessly transmitted from the mobile device that has received the request signal, and compares information for authentication included in the response signal, with information for authentication registered in the in-vehicle device, to authenticate the mobile device. In this way, it is possible to implement unlocking and locking the doors, starting the engine, and the like, based on authentication of the mobile device.

Concerning such a smart key system, a method of stealing a vehicle, called "relay attack", has been known. Since a request signal is transmitted from an in-vehicle device so as to reach just within the vehicle compartment or a limited area out of the vehicle compartment, a mobile device held by a user positioned out of the area cannot receive a request signal. However, even if the user holding the mobile device is out of the area, a malicious third person may use a repeater for relaying a request signal transmitted from the in-vehicle device to the mobile device, and this make it possible for the third person to unlock the doors, to start the engine, and the like. This is called a "relay attack". Therefore, various technologies have been proposed to prevent relay attacks (see, for example, Patent Document 1).

Patent Document 1 describes a mobile device that transmits a response signal in response to receiving a request signal from an in-vehicle device, by an antenna using a gain lower than a gain normally used when transmitting an unlock signal in a remote keyless entry function. According to a configuration in Patent Document 1, output of the response signal is controlled when transmitted from the mobile device in response to a request signal from the in-vehicle device. This makes it difficult for a relay attacker to steal the vehicle because even if the mobile device out of the communication range of the in-vehicle device can receive the request signal from the in-vehicle device by relaying, the response signal transmitted from the mobile device may be prevented from reaching the in-vehicle device.

Note that it is assumed in the present disclosure that a relay attack is performed in an aspect where a repeater is used for relaying a request signal wirelessly transmitted from an in-vehicle device, not in an aspect where a repeater is used for relaying a response signal wirelessly transmitted from a mobile device.

RELATED-ART DOCUMENTS

Patent Documents

[Patent Document 1] Japanese Laid-open Patent Publication No. 2012-54662

However, according to the configuration in Patent Document 1, reduction of noise-tolerance under a noisy environment is inevitable because output of a response signal is controlled when being transmitted from the mobile device.

In view of the above, it is an object of an embodiment to provide a smart key system that makes it difficult to steal a vehicle by a relay attack while securing communication performance under a noisy environment.

SUMMARY

According to a first aspect in the present disclosure, a smart key system includes an in-vehicle device configured to be installed in a vehicle; a transmitter configured to be capable of outputting a radio wave by a predetermined strength; and a mobile device configured to be capable of communicating wirelessly with the in-vehicle device. The in-vehicle device includes an operation reception unit configured to receive a predetermined operation; a storage unit configured to store first information for authentication for the mobile device that has been preregistered; a noise measurement unit configured to measure noise in a radio wave band of a main response signal to be wirelessly transmitted by the mobile device; a transmission strength determination unit configured to determine a transmission strength of the main response signal, based on a measurement result by the noise measurement unit, so as to make the transmission strength greater within a range lower than the predetermined strength while the noise becomes greater; a first transmitter unit configured to wirelessly transmit a main request signal that includes command information to command the transmission strength determined by the transmission strength determination unit, into a predetermined area; a first receiver unit configured to receive the main response signal; an authentication unit configured to authenticate the mobile device, based on the first information for authentication stored in the storage unit, and second information for authentication included in the main response signal; and a control unit configured to control executing at least one of unlocking the vehicle and starting up the vehicle, in a case where the operation reception unit has received the predetermined operation, and the authentication unit has authenticated the mobile device. The mobile device includes a second receiver unit configured to receive the main request signal; a transmission strength setting unit configured to set the transmission strength of the main response signal, based on the command information included in the main request signal; and a second transmitter unit configured to wirelessly transmit the main response signal that includes the second information for authentication by the transmission strength set by the transmission strength setting unit, in a case where the second receiver unit has received the main request signal.

The "predetermined strength" is a strength of a radio wave when output by a transmitter by maximum output (a normal strength for the mobile device to wirelessly transmit a signal via the transmitter), for example, a transmission strength that is used when the mobile device transmits an unlock signal in a remote unlock function (remote lock function). The "first information for authentication" is information for authentication of each mobile device preregistered in the in-vehicle device to execute unlocking and/or starting up the vehicle, for example, identification (ID) information specific to the mobile device, and an encryption key for challenge-response authentication. The "predetermined operations" include an operation by the user, for example, to unlock the vehicle, such as contacting a touch sensor on a door handle of the vehicle, and pressing a trigger switch disposed on a door handle. The "predetermined operations" also include an operation by the user, for example, to start up the vehicle, such as pressing a vehicle start-up switch (an engine ignition switch in an engine-driven vehicle) placed around the steering column. Also, the "second information for authentication" is information specific to and stored in a mobile device to be authenticated, such as ID information and a decrypted result of an encryption code in challenge-response authentication.

In this way, according to the first aspect, the noise measurement unit of the in-vehicle device measures noise in a radio wave band of a main response signal to be wirelessly transmitted by the mobile device; the transmission strength determination unit of the in-vehicle device determines the transmission strength of the main response signal, based on a measurement result by the noise measurement unit, so as to make the transmission strength greater within a range lower than the predetermined strength, which corresponds to the maximum output of the transmitter, while the noise becomes greater; and the first transmitter unit of the in-vehicle device wirelessly transmits a main request signal that includes command information to command the transmission strength determined by the transmission strength determination unit, into a predetermined area. Then, the second receiver unit of the mobile device receives the main request signal; the transmission strength setting unit of the mobile device sets the transmission strength of the main response signal, based on the command information included in the main request signal; and the second transmitter unit of the mobile device wirelessly transmits the main response signal, by the transmission strength set by the transmission strength setting unit. Therefore, the transmission strength of the main response signal transmitted from the mobile device (the second transmitter unit) is set to be lower than the predetermined strength that corresponds to the maximum output of the transmitter. Consequently, even if the main request signal reaches the mobile device existing out of the predetermined area by using a repeater, the main response signal is less likely to reach the in-vehicle device, which makes it difficult to steal the vehicle by a relay attack. Also, the transmission strength of the main response signal transmitted from the mobile device (the second transmitter unit) is set to be greater while the level of the noise in a radio wave band of the signal becomes greater. Therefore, it is possible to avoid degradation of communication performance in a noisy environment (that the in-vehicle device cannot receive the main response signal transmitted from the mobile device existing in the predetermined area due to the transmission strength being set comparatively lower). In other words, it is possible to make stealing a vehicle by a relay attack difficult, while securing communication performance under a noisy environment.

Also, according to a second aspect in the present disclosure, the smart key system according to the first aspect is further configured in which the first transmitter unit wirelessly transmits a preceding request signal into the predetermined area before transmitting the main request signal; the second receiver unit receives the preceding request signal; the second transmitter unit wirelessly transmits a preceding response signal by the predetermined strength, in a case where the second receiver unit has received the preceding request signal; the first receiver unit receives the preceding response signal; the noise measurement unit measures the noise in a case where the first receiver unit has received the preceding response signal; and the transmission strength determination unit determines the transmission strength of the main response signal, based on the measurement result by the noise measurement unit, and a reception strength of the preceding response signal received by the first receiver unit, so as to make the transmission strength of the main response signal greater within the range lower than the predetermined strength, while the noise becomes greater and while the reception strength becomes lower.

According to the second aspect, the first transmitter unit of the in-vehicle device wirelessly transmits a preceding request signal before transmitting the main request signal, and if the second receiver unit of the mobile device has received the preceding request signal, the second transmitter unit of the mobile device wirelessly transmits a preceding response signal by the predetermined strength (a normal transmission strength). Then, if the first receiver unit of the in-vehicle device has received the preceding response signal, the noise measurement unit of the in-vehicle device measures noise, the transmission strength determination unit of the in-vehicle device determines the transmission strength of the main response signal, based on a measurement result by the noise measurement unit, and the reception strength of the preceding response signal received by the first receiver unit, so as to make the transmission strength greater within a range lower than the predetermined strength, while the level of the noise becomes greater and while the reception strength becomes lower. Therefore, the lower the reception strength of the preceding response signal transmitted from the mobile device (the second transmitter unit) becomes, the greater the transmission strength of the main response signal is set, and hence, communication performance in a noisy environment can be secured more appropriately. For example, depending on an environment around the position where a user holding the mobile device exists, the reception strength of a signal from the mobile device received at the in-vehicle device may become weaker. Also, the reception strength may become weaker when the capacitance of the battery of the mobile device becomes lower. Therefore, by setting the transmission strength of the main response signal greater while the reception strength of the preceding response signal transmitted from the mobile device (the second transmitter unit) becomes lower, it is possible to prevent communication performance in a noisy environment from degrading.

According to an embodiment, it is possible to provide a smart key system that prevents a vehicle from being stolen by a relay attack while securing communication performance under a noisy environment.

BRIEF DESCRIPTION OF DRAWINGS

FIG. 2 is a diagram illustrating an example of a format of an LF signal transmitted from an in-vehicle device;

DESCRIPTION OF EMBODIMENTS

In the following, embodiments will be described with reference to the drawings.

First Embodiment

Figure 1:
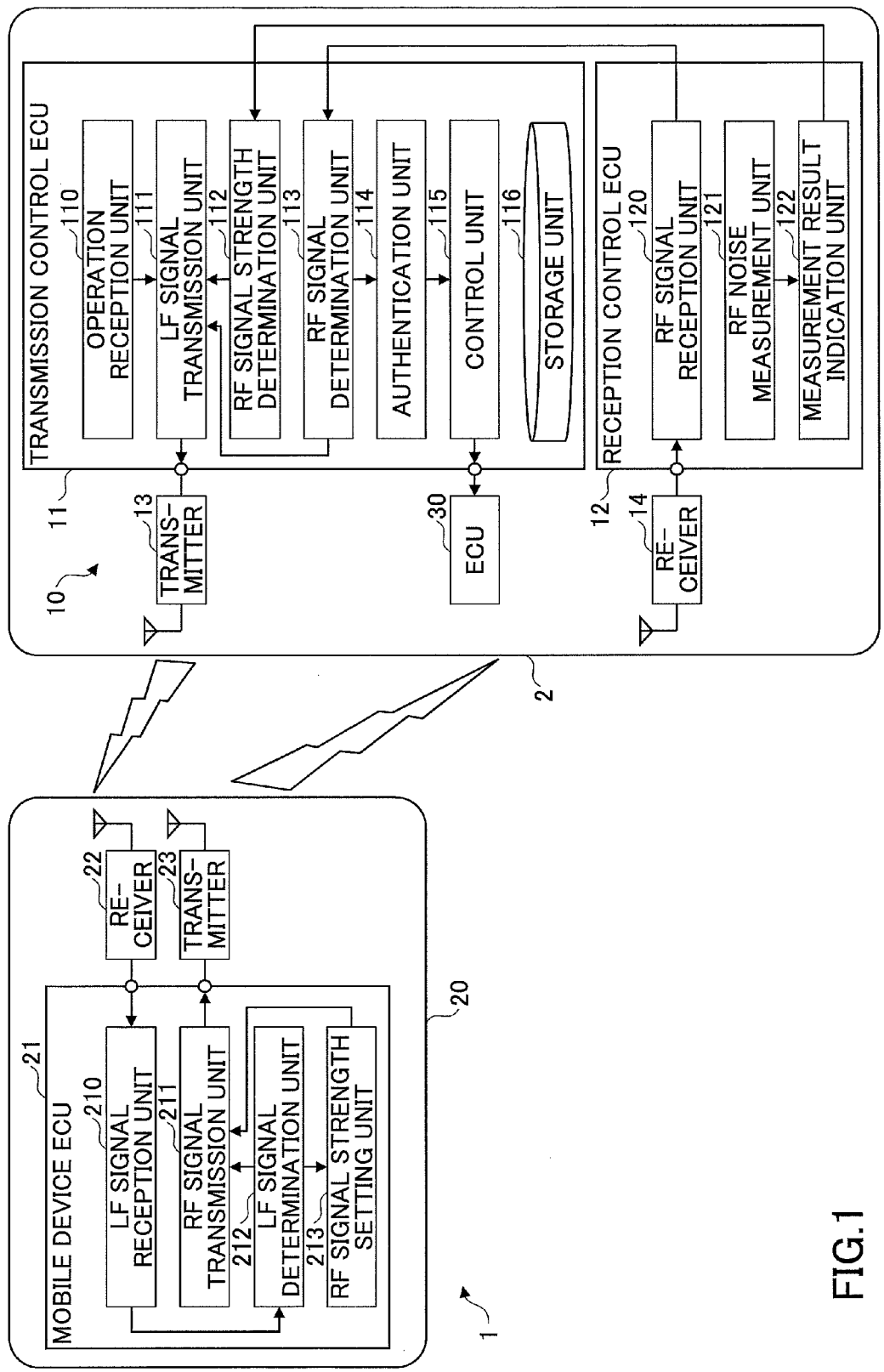
FIG. 1 is a configuration diagram schematically illustrating an example of a configuration of a smart key system according to a first embodiment.

FIG. 1 is a configuration diagram schematically illustrating an example of a configuration of a smart key system 1 according to a first embodiment.

The smart key system 1 includes an in-vehicle device 10 installed in a vehicle 2, and a mobile device (a smart key) 20 capable of wirelessly communicating with the in-vehicle device 10. The vehicle 2 also includes an ECU 30 as an element relating to the smart key system 1.

In the smart key system 1, when a user holding the mobile device 20 performs a predetermined operation on the vehicle 2, the in-vehicle device 10 wirelessly transmits a low frequency (LF) signal into the vehicle compartment or a predetermined area out of the vehicle compartment, and the mobile device 20 having received the LF signal, wirelessly transmits a radio frequency (RF) or high frequency signal that includes information for authentication specific to the mobile device 20. Then, the in-vehicle device 10 authenticates the mobile device 20, based on the transmitted information for authentication included in the RF signal, and master information for authentication preregistered in the in-vehicle device 10. By using such an authentication function, a smart entry function can be implemented, by which a user holding the mobile device 20 can unlock and lock the doors of the vehicle 2, just by performing a predetermined operation such as contacting a touch sensor on a door handle of the vehicle 2, and pressing a trigger switch. Also, by using such an authentication function, a function to start up the vehicle 2 (referred to as a "keyless vehicle start-up function", below) can be implemented, by which a user holding the mobile device 20 can start up the vehicle 2, just by performing a predetermined operation such as pressing a button for starting up the vehicle disposed around the steering column without performing a key insertion operation or the like.

Also, the mobile device 20 has an operational unit disposed (not illustrated), and in response to a user operation on the operational unit, transmits an unlock signal (a lock signal) to the in-vehicle device 10. Then, in response to receiving the unlock signal (the lock signal), the in-vehicle device 10 unlocks (locks) the doors of the vehicle 2. In other words, the smart key system 1 includes a remote unlock function (a remote lock function).

Note that "starting up the vehicle" means having the vehicle transition to a state in which the vehicle can travel following operations by the driver, for example, ignition on (IG-ON) for an engine-driven vehicle, or starting up a control unit (for example, an HV-ECU) that controls the entire vehicle cooperatively for an electric vehicle (including a hybrid vehicle and a range extender vehicle).

The in-vehicle device 10 includes a transmission control ECU (Electrical Control Unit) 11, a reception control ECU 12, a transmitter 13, and a receiver 14.

Note that the transmission control ECU 11 and the reception control ECU 12 are connected to be capable of communicating with each other by any communication protocol (for example, serial communication by UART (Universal Asynchronous Receiver Transmitter), or an in-vehicle network such as CAN (Controller Area Network)). Also, functions of the transmission control ECU 11 and functions of the reception control ECU 12 may be implemented by a single ECU.

The transmission control ECU 11 is an electronic control unit that is connected with the transmitter 13 to be capable of communicating with each other, and executes a control process for wirelessly transmitting an LF signal via the transmitter 13. The transmission control ECU 11 may be constituted with, for example, a microcomputer and the like, to implement various control processes by running various programs stored in a ROM, on a CPU. The transmission control ECU 11 includes an operation reception unit 110, an LF signal transmission unit 111, an RF signal strength determination unit 112, an RF signal determination unit 113, an authentication unit 114, and a control unit 115, as functional units that are implemented by running one or more corresponding programs stored in the ROM, on the CPU. The transmission control ECU 11 also includes a storage unit 116 that is implemented by a storage area allocated in an internal non-volatile memory (for example, an EEPROM ((Electrically Erasable Programmable Read-Only Memory)).

The operation reception unit 110 receives a predetermined operation to execute a predetermined function based on authentication of the mobile device 20 on the vehicle 2. The predetermined operations include, as described above, contacting a touch sensor on a door handle of the vehicle 2, and pressing a trigger switch, performed by the user to unlock and lock the doors of the vehicle 2 from the outside of the vehicle compartment (to execute the smart entry function), based on authentication of the mobile device 20. The predetermined operations also include, as described above, pressing a button for starting up the vehicle disposed around the steering column and the like, performed by the user to start up the vehicle 2 (to execute the keyless vehicle start-up function), based on authentication of the mobile device 20. When receiving a predetermined operation, the operation reception unit 110 indicates to the LF signal transmission unit 111 that the predetermined operation has been received.

Note that the predetermined functions based on authentication of the mobile device 20 may include any function other than the smart entry function and the keyless vehicle start-up function.

The LF signal transmission unit 111 executes a process for wirelessly transmitting an LF signal into a predetermined area (an area around the vehicle 2) via the transmitter 13. To implement the smart entry function, the predetermined area may cover, for example, a range having the radius of several meters extending towards the outside from (the transmission antenna of) the transmitter 13 that may be built in a door of the vehicle 2. Also, to implement keyless vehicle start-up function, the predetermined area may cover, for example, a range that corresponds to the vehicle compartment including (the transmission antenna of) the transmitter 13 that may be built in the center console of the vehicle 2.

In response to receiving an indication from the operation reception unit 110 that a predetermined operation has been received, the LF signal transmission unit 111 executes a process for outputting a first LF signal (an example of a preceding request signal) to the transmitter 13, and wirelessly transmitting the first LF signal into the predetermined area via the transmitter 13. Also, when the reception control ECU 12 (or an RF signal reception unit 120 of the ECU 12, which will be described later) receives a first RF signal (an example of a preceding response signal) transmitted from the mobile device 20, the LF signal transmission unit 111 executes a process for outputting a second LF signal (an example of a main request signal) that includes command information (information about a transmission strength command) commanding the transmission strength of a second RF signal (an example of a main response signal) determined by the RF signal strength determination unit 112 to the transmitter 13, and wirelessly transmitting the second LF signal into the predetermined area via the transmitter 13. Specifically, the first LF signal is a wake signal to wake up the mobile device 20 (or the mobile device ECU 21, which will be described later) that has been in a reception wait state (functions other than the receiver function are in a sleep state). Also, the second LF signal is a request signal (a main request signal) requesting for transmission of a response signal (a second RF signal) that includes information for authentication of transmission to authenticate the mobile device 20. In the following, a format of an LF signal will be described with reference to FIG. 2.

Note that the LF signal transmission unit 111 can recognize that the RF signal reception unit 120 has received the first RF signal, based on the indication from the RF signal determination unit 113.

FIG. 2 is a diagram illustrating an example of a format of an LF signal (a first LF signal or a second LF signal).

The LF signal includes fields of the wake burst, start bit (Start), authentication command, and information about transmission strength command.

The wake burst is a signal part to wake up the mobile device 20 (to transition to a wake state).

The start bit is a signal part to indicate that an authentication command or information about transmission strength command is included.

The authentication command is a command requesting for information for authentication of transmission as reply. The authentication command includes an encrypted identification code specific to the vehicle 2 (the in-vehicle device 10).

The information about transmission strength command is, as described above, command information for commanding the transmission strength of a second RF signal (an RF signal transmitting information for authentication of transmission as reply) determined by the RF signal strength determination unit 112.

Note that a first LF signal does not include information about transmission strength command (the signal part that corresponds to the information about transmission strength command is null for a first LF signal).

Referring back to FIG. 1, the RF signal strength determination unit 112 determines the transmission strength of the second RF signal based on a measurement result of noise in a radio wave band (an RF band of 300 MHz to 3 GHz) of the RF signal by the RF noise measurement unit 121 (which will be described later), indicated from the measurement result indication unit 122 (which will be described later). In the following, a method of determining the transmission strength will be described with reference to FIG. 3.

Figure 3:
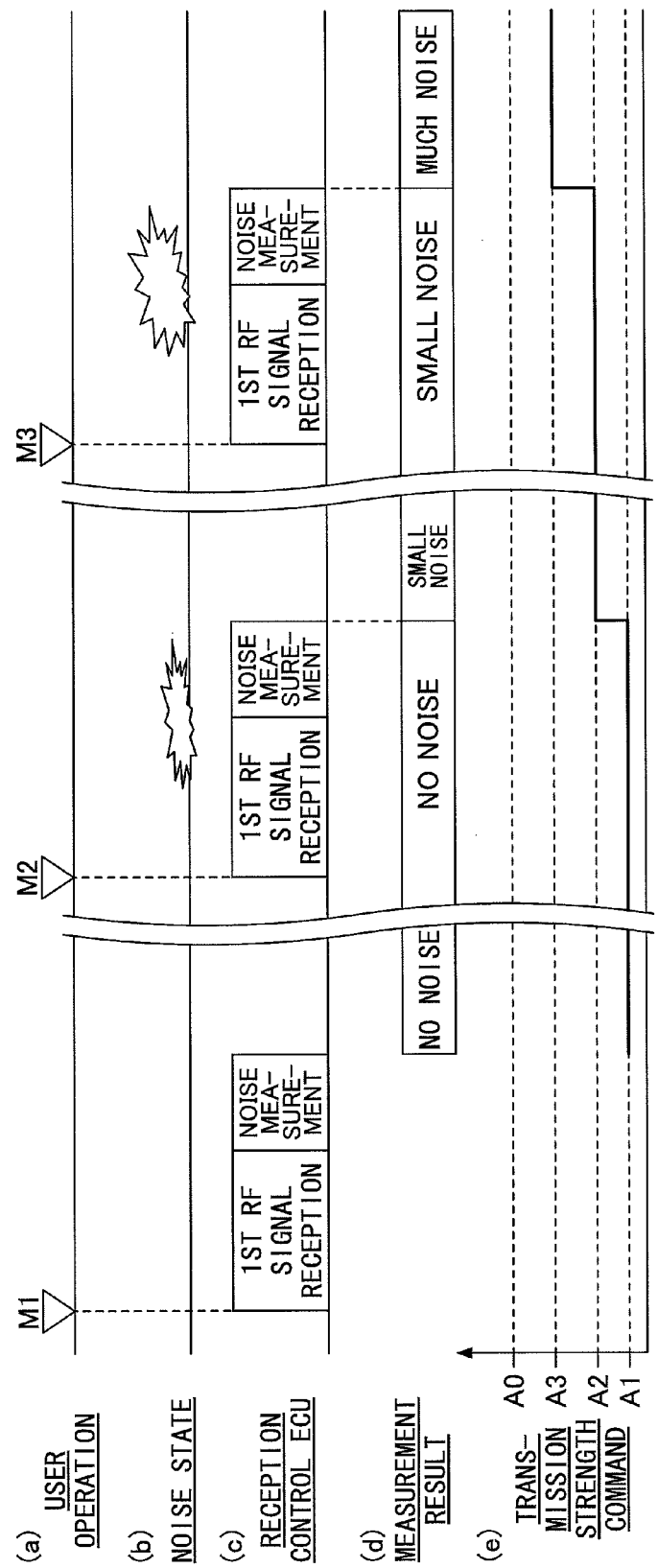
FIG. 3 is a diagram illustrating an example of a method of determining transmission strength of a second RF signal transmitted from a mobile device.

FIG. 3 is a diagram illustrating an example of a method of determining the transmission strength of a second RF signal. Specifically, FIG. 3 illustrates temporal changes of (a) the operational state by the user; (b) the noise state in the RF band; (c) the operational state of the reception control ECU 12; (d) the state of noise measurement result; and (e) the state of the transmission strength command value by the RF signal strength determination unit 112, respectively. It is assumed in the following description that the RF noise measurement unit 121 outputs a measurement result "no noise" if the noise measured in the RF band is below a predetermined strength I1, outputs a measurement result "small noise" if the noise is greater than or equal to the strength I1 and less than a predetermined strength I2 (>I1), and outputs a measurement result "much noise" if the noise is greater than or equal to the strength I2. Also, the strength A0 is a transmission strength taken when transmitting a radio wave by the maximum output of the mobile device 20 (the transmitter 23 as will be described later), which is the normal transmission strength taken when the mobile device 20 transmits an RF signal, for example, a transmission strength taken when the mobile device 20 transmits an unlock signal (a lock signal) in the remote unlock function (remote lock function).

As illustrated in (a) and (c) in FIG. 3, once the operation reception unit 110 has received an operation M1 performed by the user, the LF signal transmission unit 111 transmits a first LF signal, and the RF signal reception unit 120 receives a first RF signal wirelessly transmitted from the mobile device 20 in response to the first LF signal. As illustrated in (c) and (d) in FIG. 3, after having received the first RF signal by the RF signal reception unit 120, the RF noise measurement unit 121 measures the noise, and outputs a measurement result "no noise" as for the noise state (see (b) in FIG. 3). In response to the measurement result "no noise", the RF signal strength determination unit 112 sets the command value of the transmission strength of the second RF signal (the transmission strength command value) to a strength A1 that is lower than the strength A0 as illustrated in (e) in FIG. 3.

Also, as illustrated in (a) and (c) in FIG. 3, once the operation reception unit 110 has received an operation M2 performed by the user, the LF signal transmission unit 111 transmits a first LF signal, and the RF signal reception unit 120 receives a first RF signal wirelessly transmitted from the mobile device 20 in response to the first LF signal. As illustrated in (c) and (d) in FIG. 3, after having received the first RF signal by the RF signal reception unit 120, the RF noise measurement unit 121 measures the noise, and outputs a measurement result "small noise" as for the noise state (see (b) in FIG. 3). In response to the measurement result "small noise", the RF signal strength determination unit 112 sets the command value of the transmission strength to a strength A2 (>A1) that is lower than the strength A0 as illustrated in (e) in FIG. 3.

Also, as illustrated in (a) and (c) in FIG. 3, once the operation reception unit 110 has received an operation M3 performed by the user, the LF signal transmission unit 111 transmits a first LF signal, and the RF signal reception unit 120 receives a first RF signal wirelessly transmitted from the mobile device 20 in response to the first LF signal. As illustrated in (c) and (d) in FIG. 3, after having received the first RF signal by the RF signal reception unit 120, the RF noise measurement unit 121 measures the noise, and outputs a measurement result "much noise" as for the noise state (see (b) in FIG. 3). In response to the measurement result "much noise", the RF signal strength determination unit 112 sets the command value of the transmission strength to a strength A3 (>A2) that is lower than the strength A0 as illustrated in (e) in FIG. 3.

In this way, based on a measurement result by the RF noise measurement unit 121, the RF signal strength determination unit 112 determines the transmission strength of a second RF signal to be greater while the noise in the RF band becomes greater, within a range lower than the predetermined strength A0.

Note that although the transmission strength of a second RF signal has been set in three stages, the transmission strength may be set in two stages, or may be set in four or more stages. Also, the transmission strength of a second RF signal may be set continuously greater while the noise measured by the RF noise measurement unit 121 becomes greater.

Referring back to FIG. 1, based on a reception result indicated by the RF signal reception unit 120, the RF signal determination unit 113 determines whether the RF signal reception unit 120 has received the first RF signal. The RF signal determination unit 113 indicates the determination result to the LF signal transmission unit 111.

Also, based on a reception result indicated by the RF signal reception unit 120, the RF signal determination unit 113 determines whether the RF signal reception unit 120 has received the second RF signal. The RF signal determination unit 113 indicates the determination result to the authentication unit 114.

If the RF signal reception unit 120 has received the second RF signal, the authentication unit 114 authenticates the mobile device 20 based on master information for authentication (first information for authentication) stored in advance in the storage unit 116 and information for authentication of transmission (second information for authentication) included in the second RF signal. The authentication unit 114 may compare, for example, a master ID (preregistered ID specific to the mobile device 20) included in the master information for authentication, with the specific ID stored in the mobile device 20 and included in the information for authentication of transmission, and if the IDs are the same, may authenticate the mobile device 20. Alternatively, the authentication unit 114 may use, for example, an encryption key specific to the mobile device 20 included in the master information for authentication, to compare a decrypted result of a decodable encryption code (an encryption code wirelessly transmitted to the mobile device 20 by the second LF signal), with a decrypted result of an encryption code included in the information for authentication of transmission (a decrypted result of an encryption code by the mobile device 20 having received the second LF signal), and if the decrypted results are the same, may authenticate the mobile device 20 (challenge-response authentication). Further, the authentication unit 114 may determine whether to authenticate the mobile device 20, based on both the comparison of the IDs and the comparison of the decrypted results of encryption codes (challenge-response authentication).

Note that the authentication unit 114 may authenticate the mobile device 20 by a method of authentication other than the comparison of the IDs and the comparison of the decrypted results of encryption codes. Also, the information for authentication of transmission included in a second RF signal, such as the ID specific to the mobile device 20, may be encrypted. In this case, the authentication unit 114 uses an encryption key preregistered in the storage unit 116, to decode the encrypted information for authentication of transmission.

If the authentication unit 114 has authenticated the mobile device 20, based on exchange of the signals between the in-vehicle device 10 and the mobile device 20 triggered by reception of a predetermined operation by the operation reception unit 110, the control unit 115 outputs a control command based on the predetermined operation received by the operation reception unit 110, to the ECU 30. In other words, if the operation reception unit 110 has received the predetermined operation, and the authentication unit 114 has authenticated the mobile device 20, the control unit 115 outputs the control command to the ECU 30. If the predetermined operation received by the operation reception unit 110 is an operation to execute the smart entry function such as contacting a touch sensor on a door handle and pressing a trigger switch, the control unit 115 outputs a request for unlocking the doors or a request for locking the doors to the ECU 30. Also, if the predetermined operation received by the operation reception unit 110 is an operation to start up the vehicle 2 such as pressing a button for activating the vehicle disposed around the steering column of the vehicle 2, the control unit 115 outputs a request for starting up the vehicle to the ECU 30.

The storage unit 116 stores the master information for authentication that has been preregistered.

Note that registration of the master information for authentication is executed, for example, by a fault diagnosis tool or the like that is connected with an in-vehicle network such as CAN via a DLC3 connector or the like disposed in the vehicle 2. Specifically, the transmission control ECU 11 responds to a command transmitted from the fault diagnosis tool via the in-vehicle network, and has the storage unit 116 store the information for authentication specific to the mobile device 20 transmitted from the fault diagnosis tool (ID information, an encryption key, and the like) as the master information for authentication, to execute the registration.

The reception control ECU 12 is connected with the receiver 14 to be capable of communicating with each other, and executes a process for receiving an RF signal via the receiver 14. The reception control ECU 12 may be constituted with, for example, a microcomputer and the like, to implement various control processes by running various programs stored in a ROM, on a CPU. The reception control ECU 12 includes the RF signal reception unit 120, the RF noise measurement unit 121, and the measurement result indication unit 122, as functional units that are implemented by running one or more corresponding programs stored in the ROM, on the CPU.

The RF signal reception unit 120 executes a process for receiving RF signals (a first RF signal and a second RF signal) transmitted from the mobile device 20 via the receiver 14. The RF signal reception unit 120 indicates the reception result of an RF signal to the RF signal determination unit 113 of the transmission control ECU 11. Also, if having received a first RF signal from the mobile device 20, the RF signal reception unit 120 indicates to the RF noise measurement unit 121 that the first RF signal has been received.

If having received an indication from the RF signal reception unit 120 that the first RF signal has been received, the RF noise measurement unit 121 executes a process for measuring noise in the radio wave band of the RF signal (RF band) transmitted from the mobile device 20. Specifically, in a state where an RF signal is not being received, an FFT (Fast Fourier Transform) process is applied to a reception signal on the receiver 14, to calculate a frequency spectrum. Then, the noise in the RF band is measured by using the frequency spectrum. The RF noise measurement unit 121 indicates the measurement result (noise level) to the measurement result indication unit 122.

The measurement result indication unit 122 executes a process for indicating the measurement result by the RF noise measurement unit 121 to the RF signal strength determination unit 112 of the transmission control ECU 11.

The transmitter 13 includes a transmission antenna, modulates LF signals (a first LF signal and a second LF signal) output from the LF signal transmission unit 111 into radio waves in an LF band, and wirelessly transmits the modulated signals by a transmission strength reachable into the predetermined area. To implement the smart entry function, the transmitter 13 is installed, for example, in each door handle as described above. Also, to implement the keyless vehicle start-up function, the transmitter 13 is disposed, for example, in the center console in the vehicle compartment as described above.

Note that radio waves in the LF band include radio waves of frequencies between 30 kHz and 300 kHz.

The receiver 14 includes a reception antenna receives, demodulates RF signals (a first RF signal and a second RF signal) wirelessly transmitted by radio waves in the RF band, and inputs the demodulated RF signals into the reception control ECU 12.

The mobile device 20 includes the mobile device ECU 21, a receiver 22, and the transmitter 23.

The mobile device ECU 21 is an electronic control unit that is connected with the receiver 22 and the transmitter 23 to be capable of communicating with each other, executes a control process for receiving LF signals (a first LF signal and a second LF signal) wirelessly transmitted from the in-vehicle device 10 via the receiver 22, and executes a control process for wirelessly transmitting RF signals (a first RF signal and a second RF signal) via the transmitter 23. The mobile device ECU 21 may be constituted with, for example, a microcomputer and the like, to implement various control processes by running various programs stored in a ROM, on a CPU. The mobile device ECU 21 includes an LF signal reception unit 210, an RF signal transmission unit 211, an LF signal determination unit 212, and an RF signal strength setting unit 213, as functional units that are implemented by running one or more corresponding programs stored in the ROM, on the CPU.

The LF signal reception unit 210 executes a process for receiving LF signals (a first LF signal and a second LF signal) transmitted from the in-vehicle device 10 (the LF signal transmission unit 111) via the receiver 22. The LF signal reception unit 210 indicates the reception result of the LF signals to the LF signal determination unit 212.

Note that if having received a first LF signal, the LF signal reception unit 210 executes a process for waking up the mobile device 20 (the mobile device ECU 21) depending on the wake burst (see FIG. 2) of the first LF signal.

The RF signal transmission unit 211 executes a process for wirelessly transmitting RF signals (a first RF signal and a second RF signal) via the transmitter 23.

If the LF signal reception unit 210 has received a first LF signal (if the RF signal transmission unit 211 has received from the LF signal determination unit 212 an indication of a determination result that the LF signal reception unit 210 has received the first LF signal), the RF signal transmission unit 211 wirelessly transmits the first RF signal by the predetermined strength A0 via the transmitter 23. The first RF signal is a response signal (a preceding response signal) representing that the mobile device 20 (the LF signal reception unit 210) has received the first LF signal, and has transitioned to a wake state.

If the LF signal reception unit 210 has received a normal second LF signal, which will be described later, (if the RF signal transmission unit 211 has received from the RF signal strength setting unit 213 an indication of a determination result that the LF signal reception unit 210 has received a normal second LF signal), the RF signal transmission unit 211 transmits a second RF signal by the transmission strength commanded by the information about transmission strength command included in the second LF signal (the transmission strength set by the RF signal strength setting unit 213, based on the information about transmission strength command) via the transmitter 23. The second RF signal is generated in an aspect that includes information for authentication of transmission, depending on the authentication command included in the second LF signal.

Note that the information for authentication of transmission included in the second LF signal may be encrypted as described above.

Based on a reception result indicated by the LF signal reception unit 210, the LF signal determination unit 212 determines whether the LF signal reception unit 210 has received the first LF signal. The LF signal determination unit 212 indicates the determination result to the RF signal transmission unit 211.

Also, the LF signal determination unit 212 determines whether the LF signal reception unit 210 has received the second LF signal, based on a reception result indicated by the LF signal reception unit 210. Also, if having determined that the LF signal reception unit 210 has received the second LF signal, the LF signal determination unit 212 compares an identification code specific to the in-vehicle device 10 included in the authentication command of the second LF signal, with an identification code stored in an internal memory or the like of the mobile device ECU 21 in advance, to determine whether the identification codes are the same. If having determined that the LF signal reception unit 210 has received the second LF signal, and having determined that the identification codes are the same, the LF signal determination unit 212 outputs a determination result that "a normal second LF signal" has been received; otherwise, outputs a determination result that "a normal second LF signal" has not been received. The LF signal determination unit 212 indicates the determination result to the RF signal strength setting unit 213.

Note that the identification code specific to the in-vehicle device 10 included in the authentication command is encrypted as described above. Therefore, the LF signal determination unit 212 decodes the encrypted identification code by the encryption key stored in an internal memory or the like of the mobile device ECU 21 in advance, and then, executes the comparison.

If having received from the LF signal determination unit 212 an indication of a determination result that the LF signal reception unit 210 has received a normal second LF signal, the RF signal strength setting unit 213 sets the transmission strength by which the RF signal transmission unit 211 transmits the second RF signal, based on the information about transmission strength command included in the second LF signal. In other words, the RF signal strength setting unit 213 sets the transmission strength by which the RF signal transmission unit 211 transmits the second RF signal, to the transmission strength commanded by the information about transmission strength command. The RF signal strength setting unit 213 indicates the determination result that the LF signal reception unit 210 has received the normal second LF signal, and the setting value of the transmission strength of the second RF signal, to the RF signal transmission unit 211.

The receiver 22 includes a reception antenna, receives and demodulates LF signals (a first LF signal and a second LF signal) wirelessly transmitted by radio waves in the LF band, and inputs the demodulated LF signals into the mobile device ECU 21.

The transmitter 23 includes a transmission antenna, modulates RF signals (a first RF signal and a second RF signal) output from the RF signal transmission unit 211 into radio waves in the RF band, and wirelessly transmits the modulated signals. Specifically, the transmitter 23 modulates a first RF signal output from the RF signal transmission unit 211 in a radio wave in the RF band, and wirelessly transmits the modulated signal by the predetermined strength A0. Also, the transmitter 23 modulates a second RF signal output from the RF signal transmission unit 211 into a radio wave in the RF band, and wirelessly transmits the modulated signal by the transmission strength set by the RF signal strength setting unit 213.

The ECU 30 is an electronic control unit that is installed in the vehicle 2, and executes a control process in response to a control command output from the transmission control ECU 11 (the control unit 115). For example, if having received a request for unlocking the doors or a request for locking the doors from the control unit 115, the ECU 30 outputs an operation command to each actuator (a door-locking motor) that unlocks and locks a door. Also, for example, if having received a request for starting up the vehicle from the control unit 115 for the vehicle 2 being an engine-driven vehicle, the ECU 30 outputs a request for starting the engine (and requests accompanying the start-up of the vehicle, such as a request for unlocking the locked steering, and a request for releasing the immobilizer) to other ECUs (an engine ECU and the like).

Next, respective control processes in the in-vehicle device 10 and the mobile device 20 will be described with reference to FIG. 4 and FIG. 5.

Figure 4:
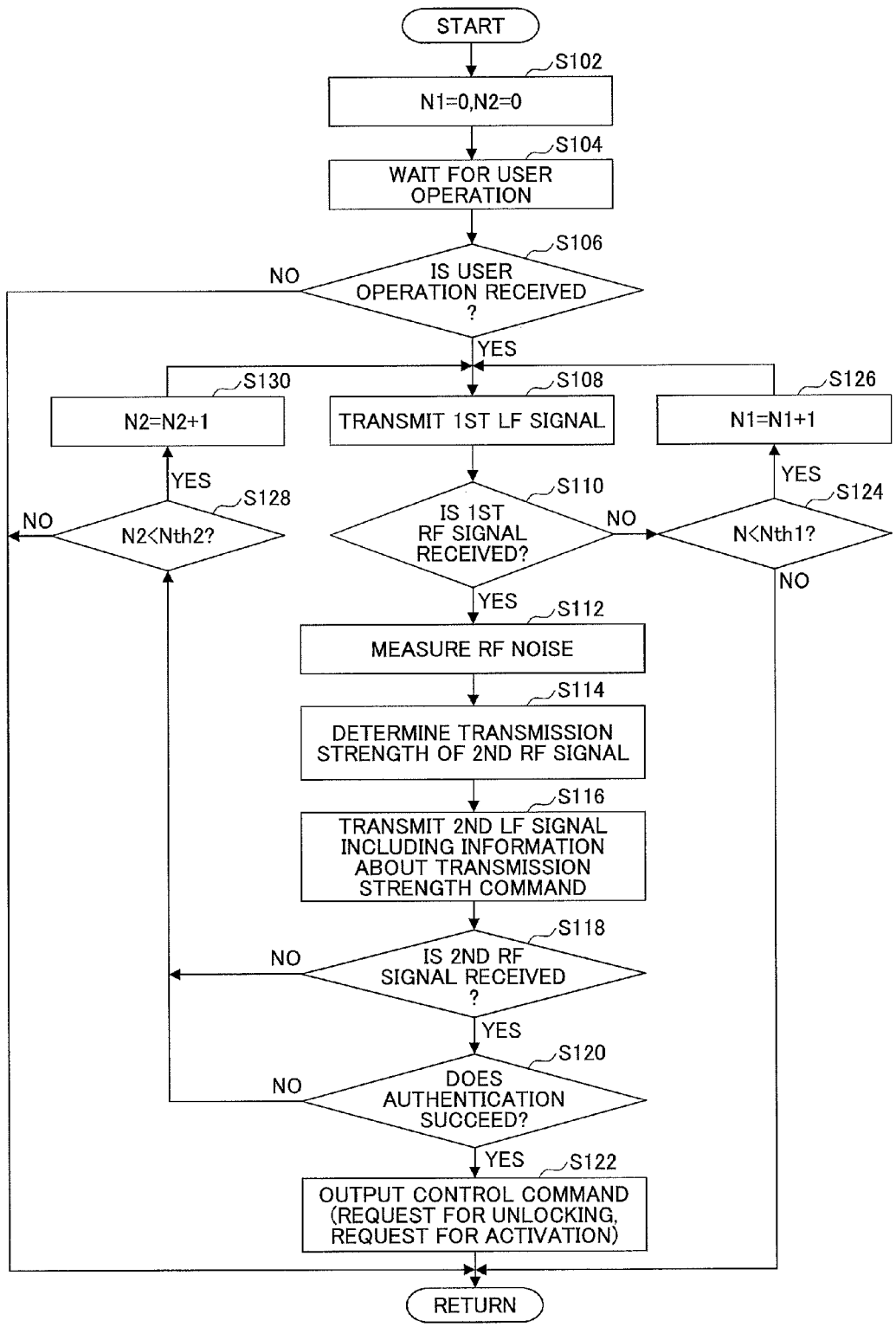
FIG. 4 is a flowchart schematically illustrating an example of a control process by an in-vehicle device according to the first embodiment.

FIG. 4 is a flowchart schematically illustrating an example of a control process by the in-vehicle device 10 according to the embodiment. The process by this flowchart is repeatedly executed at predetermined time intervals in a stop state of the vehicle 2.

Note that a stop state of the vehicle 2 means a state in which travelling is impossible in response to operations by the driver, for example, a state of ignition off (IG-ON) for an engine-driven vehicle, or a stop state of a control unit (for example, an HV-ECU) that controls the entire vehicle cooperatively for an electric vehicle.

At Step S102, the transmission control ECU 11 sets N1 and N2, whose values represent the number of retries to 0.

At Step S104, the operation reception unit 110 transitions to a state of waiting for a user operation.

At Step S106, the operation reception unit 110 determines whether a predetermined operation has been received. If a predetermined operation has been received, the operation reception unit 110 goes to Step S108; or if not having received, ends the current process.

At Step S108, the LF signal transmission unit 111 wirelessly transmits a first LF signal into the predetermined area via the transmitter 13.

At Step S110, the RF signal determination unit 113 determines whether the RF signal reception unit 120 has received a first RF signal from the mobile device 20. If the RF signal reception unit 120 has received a first RF signal from the mobile device 20, the RF signal determination unit 113 goes to Step S112; or if not having received the first RF signal, goes to Step S124.

At Step S112, the RF noise measurement unit 121 measures noise in the RF band, and the measurement result indication unit 122 indicates the measurement result to the RF signal strength determination unit 112.

At Step S114, based on the measurement result of the noise in the RF band by the RF noise measurement unit 121, the RF signal strength determination unit 112 determines the transmission strength of a second RF signal to be transmitted by the mobile device 20. Specifically, as described above, the RF signal strength determination unit 112 determines the transmission strength of the second RF signal to be greater while the noise in the RF band becomes greater within a range lower than the predetermined strength A0.

At Step S116, the LF signal transmission unit 111 wirelessly transmits a second LF signal that includes information about transmission strength command to command the transmission strength of a second RF signal determined by the RF signal strength determination unit 112 into the predetermined area via the transmitter 13.

At Step S118, the RF signal determination unit 113 determines whether the RF signal reception unit 120 has received a second RF signal from the mobile device 20. If the RF signal reception unit 120 has received a second RF signal from the mobile device 20, the RF signal determination unit 113 goes to Step S120; or if not having received the second RF signal, goes to Step S128.

At Step S120, as described above, the authentication unit 114 determines whether to authenticate the mobile device 20 (compares the IDs or the decoded contents of the encryption codes to determine whether they are the same), based on the master information for authentication stored in the storage unit 116 in advance and the information for authentication of transmission included in the second RF signal. The authentication unit 114 goes to Step S122 if authentication of the mobile device 20 succeeds, or goes to Step S128 if authentication of the mobile device 20 does not succeed.

At Step S122, the control unit 115 outputs a control command based on the predetermined operation received by the operation reception unit 110 at Step S102 (a request for unlocking or locking based on the smart entry function or a request for starting up the vehicle based on the keyless vehicle start-up function) to the ECU 30, and ends the current process.

On the other hand, at Step S124, the transmission control ECU 11 determines whether the value of N1 representing the number of retries is less than a predetermined threshold Nth1 representing an upper limit of the number of retries. The transmission control ECU 11 goes to Step S126 if the value of N1 is less than the predetermined threshold Nth1; or ends the current process if the value of N1 is not less than the predetermined threshold Nth1.

Then, at Step S126, the transmission control ECU 11 increments the value of N1, goes back to Step S108, to repeat Steps S108 and after.

In other words, even if the LF signal transmission unit 111 has wirelessly transmitted a first LF signal, but the RF signal reception unit 120 could not receive a first RF signal (NO at Step S110), the transmission control ECU 11 executes retries until receiving a first RF signal as a reply from the mobile device 20, unless the number of retries exceeds the predetermined threshold Nth as the upper limit. This makes it possible to receive the first RF signal even if the in-vehicle device 10 cannot temporarily receive the first RF signal from the mobile device 20 due to an influence of noise or the like, or if the transmission strength of the first RF signal itself wirelessly transmitted from the mobile device 20 is comparatively weak due to an insufficient battery capacitance or the like.

Also, at Step S128, the transmission control ECU 11 determines whether the value of N2 representing the number of retries is less than a predetermined threshold Nth2 representing an upper limit of the number of retries. The transmission control ECU 11 goes to Step S130 if the value of N2 is less than the predetermined threshold Nth2; or ends the current process if the value of N2 is not less than the predetermined threshold Nth2.

Then, at Step S130, the transmission control ECU 11 increments the value of N2, and goes back to Step S108, to repeat Steps S108 and after.

In other words, even if the LF signal transmission unit 111 has wirelessly transmitted a second LF signal, but the RF signal reception unit 120 could not receive a second RF signal (NO at Step S118), a retry is going to be executed starting back from the step of transmitting the first LF signal. This makes it possible to receive the second RF signal even if the in-vehicle device 10 cannot temporarily receive the second RF signal from the mobile device 20 due to an influence of noise or the like, or if the transmission strength of the second RF signal itself wirelessly transmitted from the mobile device 20 is comparatively weak due to an insufficient battery capacitance or the like. Similarly, if authentication of the mobile device 20 does not succeed based on the information for authentication of transmission included in the second RF signal (NO at Step S120), a retry is going to be executed starting back from the step of transmitting the first LF signal. This makes it possible to receive the second RF signal from the mobile device 20 even if, for example, authentication has been done for a second RF signal received from another mobile device that is incidentally of the same type (corresponding to the same vehicle type) as the mobile device 20. Also, by executing a retry starting back from the step of transmitting the first LF signal, the noise in the RF band can be measured again in a latest state at Step S112, to determine the transmission strength of a second RF signal in the latest state.

Note that the predetermined thresholds Nth1 and Nth2 are adaptive values set in advance. Also, the retry process may be simplified so that the process returns to Step S116 after Step S130. In other words, the retry process may be configured so that once the transmission strength of a second RF signal has been determined at Step S114, the second LF signal is transmitted in a retry (Step S116) without having the information about transmission strength command changed, to repeat the steps (Steps S118 and S120).

Figure 5:
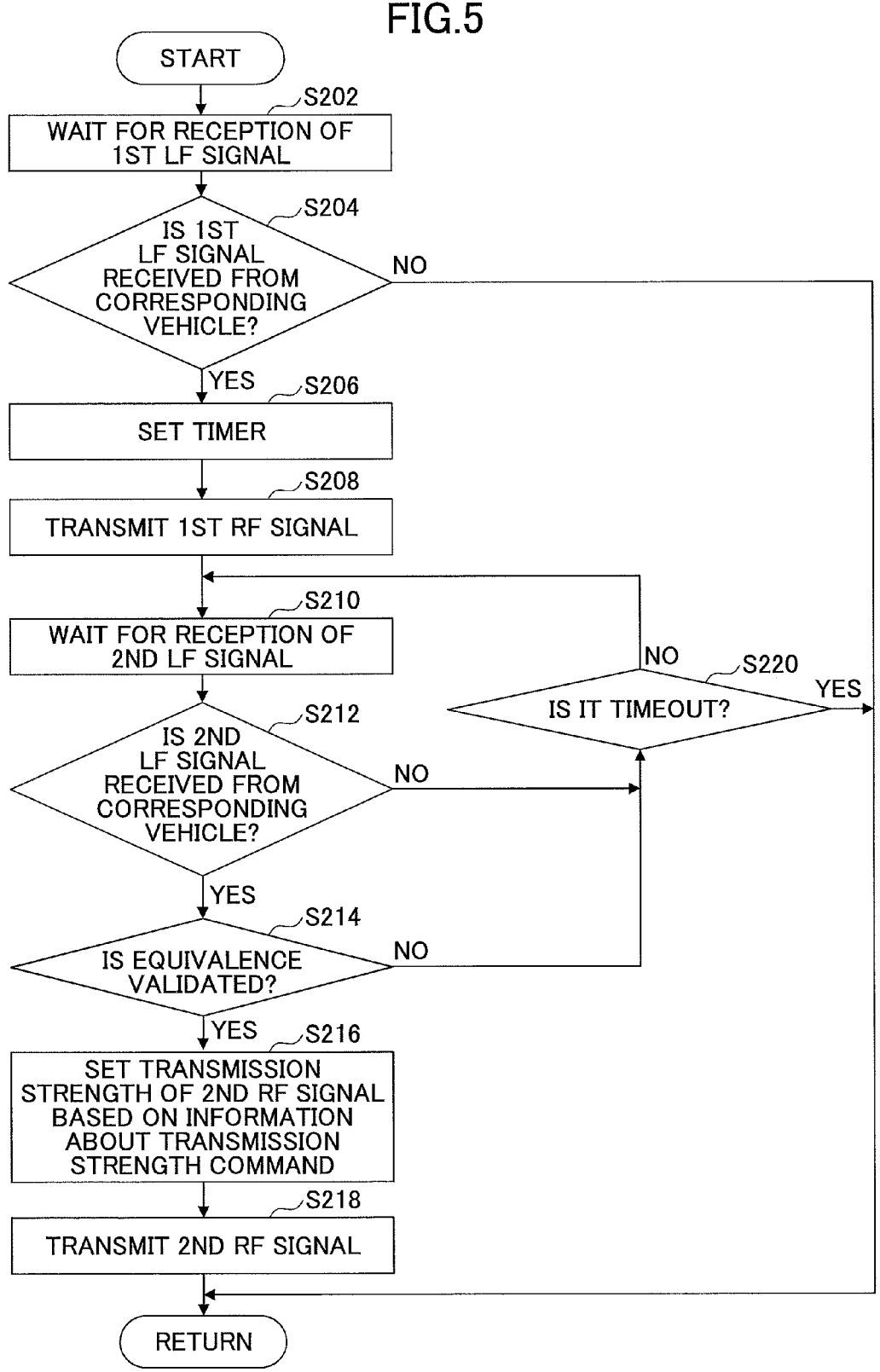
FIG. 5 is a flowchart schematically illustrating an example of a control process by a mobile device according to the first embodiment.

Next, FIG. 5 is a flowchart schematically illustrating an example of a control process by the mobile device 20 according to the embodiment. The process by this flowchart is repeatedly executed at predetermined time intervals.

At Step S202, the LF signal reception unit 210 transitions to a state of waiting for reception of a first LF signal.

At Step S204, the LF signal determination unit 212 determines whether the LF signal reception unit 210 has received a first LF signal from the vehicle 2 (the in-vehicle device 10). The LF signal determination unit 212 goes to Step S206 if the LF signal reception unit 210 has received a first LF signal; or ends the current process if not having received.

Note that in a parking lot or the like, another vehicle (a vehicle of a different or the same type) may exist around the vehicle 2, and wirelessly transmits an LF signal by using a radio wave in the LF band as done by the vehicle 2. Therefore, at Step S204, the LF signal determination unit 212 also determines whether the format of a first LF signal (see FIG. 2) is to be transmitted from a corresponding vehicle (a vehicle that transmits an LF signal in the same format as vehicles including the vehicle 2). Substantially the same determination is done at Step S212, which will be described later.

At Step S206, the mobile device ECU 21 sets a timer that will be timed out at a predetermined time T1.

Note that the predetermined time T1 is an adaptive value that is appropriately determined considering, for example, current consumption or the like caused by continuing a wake state of the mobile device 20.

At Step S208, the RF signal transmission unit 211 wirelessly transmits a first RF signal by the predetermined strength A0 via the transmitter 23.

At Step S210, the LF signal reception unit 210 transitions to a state of waiting for reception of a second LF signal.

At Step S212, the LF signal determination unit 212 determines whether the LF signal reception unit 210 has received a second LF signal from the vehicle 2 (the in-vehicle device 10). The LF signal determination unit 212 goes to Step S214 if the LF signal reception unit 210 has received a second LF signal; or goes to Step S220 if not having received.

At Step S214, the LF signal determination unit 212 compares the identification code specific to the in-vehicle device 10 included in the authentication command the second LF signal, with the identification code stored in an internal memory or the like of the mobile device ECU 21 in advance, to determine whether the identification codes are the same. The LF signal determination unit 212 goes to Step S216 if the identification codes are the same; or goes to Step S220 if not the same.

At Step S216, the RF signal strength setting unit 213 sets the transmission strength of the second RF signal to the transmission strength commanded by the information about transmission strength command included in the second LF signal.

At Step S218, the RF signal transmission unit 211 wirelessly transmits the second RF signal that includes the information for authentication of transmission by the transmission strength set at Step S216 via the transmitter 23, and ends the current process.

On the other hand, at Step S220, the mobile device ECU 21 determines whether the timer has timed out. The mobile device ECU 21 goes back to Step S210 to repeat Steps S210 and after if the timer has not timed out; or ends the current process if timed out.

In other words, if the LF signal reception unit 210 could not receive the second LF signal (NO at Step S212), the transmission control ECU 11 repeats retries for the predetermined time T1 after the LF signal reception unit 210 has received the first LF signal. This makes it possible to receive the second RF signal by multiple retries even in a state where it is difficult to receive the second LF signal due to, for example, an influence of noise, the position of the user holding the mobile device 20 located around the boundary of the reachable distance of the second LF signal, and the like. Similarly, if the LF signal reception unit 210 could not receive a normal second LF signal (NO at Step S214), the transmission control ECU 11 repeats retries for the predetermined time T1 after the LF signal reception unit 210 has received the first LF signal. This makes it possible to receive a normal second LF signal by multiple retries, for example, even if a second RF signal has been received from another vehicle of the same type incidentally parking around the vehicle 2.

In this way, in the present embodiment, the RF noise measurement unit 121 of the in-vehicle device 10 measures noise in the radio wave band (the RF band) of an RF signal (a second RF signal) wirelessly transmitted by the mobile device 20; the transmission strength determination unit 112 of the in-vehicle device 10 determines the transmission strength of the second RF signal, based on a measurement result by the RF noise measurement unit 121, so as to make the transmission strength greater within a range lower than the predetermined strength A0 while the noise becomes greater; and the LF signal transmission unit 111 of the in-vehicle device 10 wirelessly transmits a second LF signal that includes command information to command the transmission strength (information about transmission strength command) determined by the RF signal strength determination unit 112, into the predetermined area. Then, the LF signal reception unit 210 of the mobile device 20 receives the second LF signal; the RF signal strength setting unit 213 of the mobile device 20 sets the transmission strength of a second RF signal based on the information about transmission strength command included in the second LF signal; and the RF signal transmission unit 211 of the mobile device 20 wirelessly transmits the second RF signal by the transmission strength set by the RF signal strength setting unit 213. Therefore, the transmission strength of the second RF signal transmitted from the mobile device 20 (the RF signal transmission unit 211) is set to be lower than the predetermined strength A0. Consequently, even if the second LF signal reaches the mobile device 20 existing out of the predetermined area by using a repeater, the second RF signal becomes less likely to reach the in-vehicle device 10, which makes it difficult to steal the vehicle by a relay attack. Also, the transmission strength of the second RF signal transmitted from the mobile device 20 (the RF signal transmission unit 211) is set to be greater while the level of the noise in the radio wave band (RF band) of the signal becomes greater. Therefore, it is possible to avoid degradation of communication performance in a noisy environment (that the in-vehicle device 10 cannot receive the second RF signal transmitted from the mobile device 10 existing in the predetermined area due to the transmission strength set comparatively lower). In other words, it is possible to make stealing a vehicle difficult by a relay attack while securing communication performance under a noisy environment. Also, it is possible to make stealing a vehicle difficult by just adding the functions of the RF noise measurement unit 121 and the RF signal strength determination unit 112 in the in-vehicle device 10, and the functions of the RF signal strength setting unit 213 in the mobile device 20, without considerable enhancement of processing capability and communication capability. In other words, it is possible to make stealing a vehicle difficult while avoiding the cost increase.

Also, in the present embodiment, the RF signal strength determination unit 112 that determines the transmission strength of a second RF signal based on a measurement result of noise in the RF band by the RF noise measurement unit 121, can further consider the reception strength of the first RF signal in the RF signal reception unit 120, to determine the transmission strength of the second RF signal. Specifically, the RF signal strength determination unit 112 determines the transmission strength of the second RF signal, based on a measurement result of noise in the RF band by the RF noise measurement unit 121, and the reception strength of the first RF signal received by the RF signal reception unit 120, so as to make the transmission strength greater within a range lower than the predetermined strength A0, while the level of the noise in the RF band becomes greater, and while the reception strength of the first RF signal becomes lower. Therefore, the lower the reception strength of the first RF signal transmitted from the mobile device 20 (the RF signal transmission unit 211) becomes, the greater the transmission strength of the second RF signal is set, and hence, communication performance in a noisy environment can be secured more appropriately. For example, depending on an environment around the position where the user holding the mobile device 20 exists, the reception strength of an RF signal from the mobile device 20 received at the in-vehicle device 10 (the RF signal reception unit 120) may become weak. Also, the reception strength may become weak when the capacitance of the battery of the mobile device 20 becomes lower. Therefore, by setting the transmission strength of the second RF signal greater while the reception strength of the first RF signal transmitted from the mobile device 20 (the RF signal transmission unit 211) becomes lower, it is possible to prevent communication performance in a noisy environment from degrading.

Note that if the RF signal strength determination unit 112 does not take the reception strength of the first RF signal into consideration when determining the transmission strength of a second RF signal, the process may return to Step S112 after Step S130 in the flowchart in FIG. 4.

Second Embodiment

Next, a second embodiment will be described.

Figure 6:
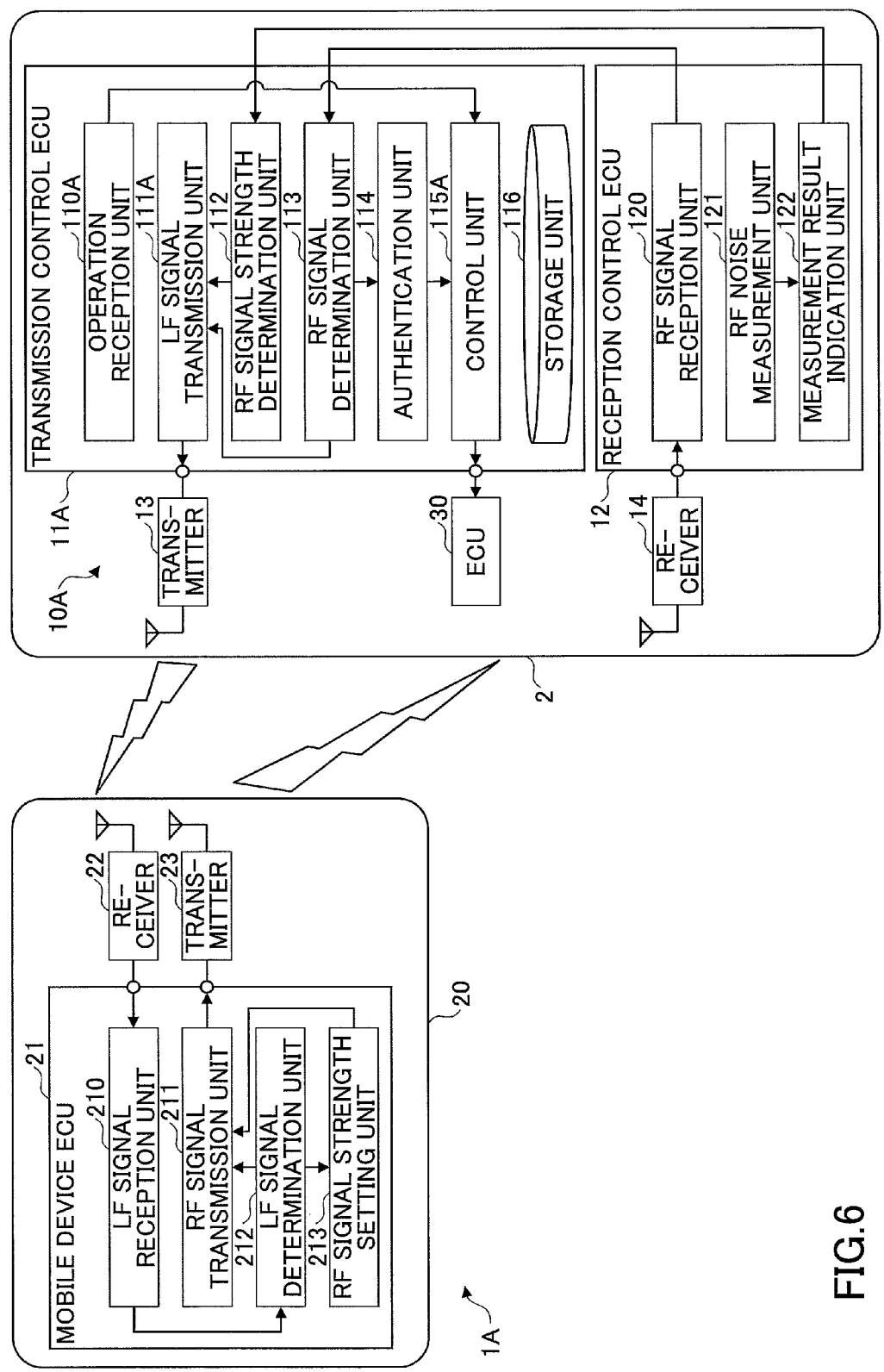
FIG. 6 is a configuration diagram schematically illustrating an example of a configuration of a smart key system according to a second embodiment.

FIG. 6 is a configuration diagram schematically illustrating an example of a configuration of a smart key system 1A according to the second embodiment.

The smart key system 1A according to the second embodiment has an in-vehicle device 10A (a transmission control ECU 11A), which replaces the in-vehicle device 10 (the transmission control ECU 11), and makes a difference from the first embodiment. Specifically, the operation reception unit 110, the LF signal transmission unit 111, and the control unit 115 are replaced by an operation reception unit 110A, an LF signal transmission unit 111A, and a control unit 115A, respectively. In the following, the same elements as in the first embodiment are assigned the same codes, and different parts will be mainly described.

If having received a predetermined operation, the operation reception unit 110A indicates to the control unit 115A that the predetermined operation has been received, which is different from the first embodiment.

The LF signal transmission unit 111A executes a process for outputting a first LF signal to the transmitter 13, and wirelessly transmitting the signal via the transmitter 13 into the predetermined area at predetermined cycles, which is different from the first embodiment. Also, when the reception control ECU 12 (the RF signal reception unit 120) receives a first RF signal transmitted from the mobile device 20, the LF signal transmission unit 111A executes a process for outputting a second LF signal that includes information about a transmission strength command commanding the transmission strength of a second RF signal determined by the RF signal strength determination unit 112 to the transmitter 13, and wirelessly transmitting the second LF signal into the predetermined area via the transmitter 13, which is similar to the first embodiment.

Note that the format of a first LF signal and a second LF signal is the same as in the first embodiment (see FIG. 2).

If the authentication unit 114 has authenticated the mobile device 20, and the control unit 115A receives from the operation reception unit 110A, within a predetermined time T2 after the reception, an indication that the predetermined operation has been received, then, the control unit 115A outputs a control command based on the predetermined operation (a request for unlocking and locking the doors, a request for starting up the vehicle, and the like) to the ECU 30. In other words, if the authentication unit 114 has authenticated the mobile device 20 and the operation reception unit 110A has received the predetermined operation, the control unit 115A outputs the control command to the ECU 30.

Next, a control process in the in-vehicle device 10A will be described with reference to FIG. 7.

Note that a control process in the mobile device 20 is the same as in the first embodiment, and the description is omitted.

Figure 7:
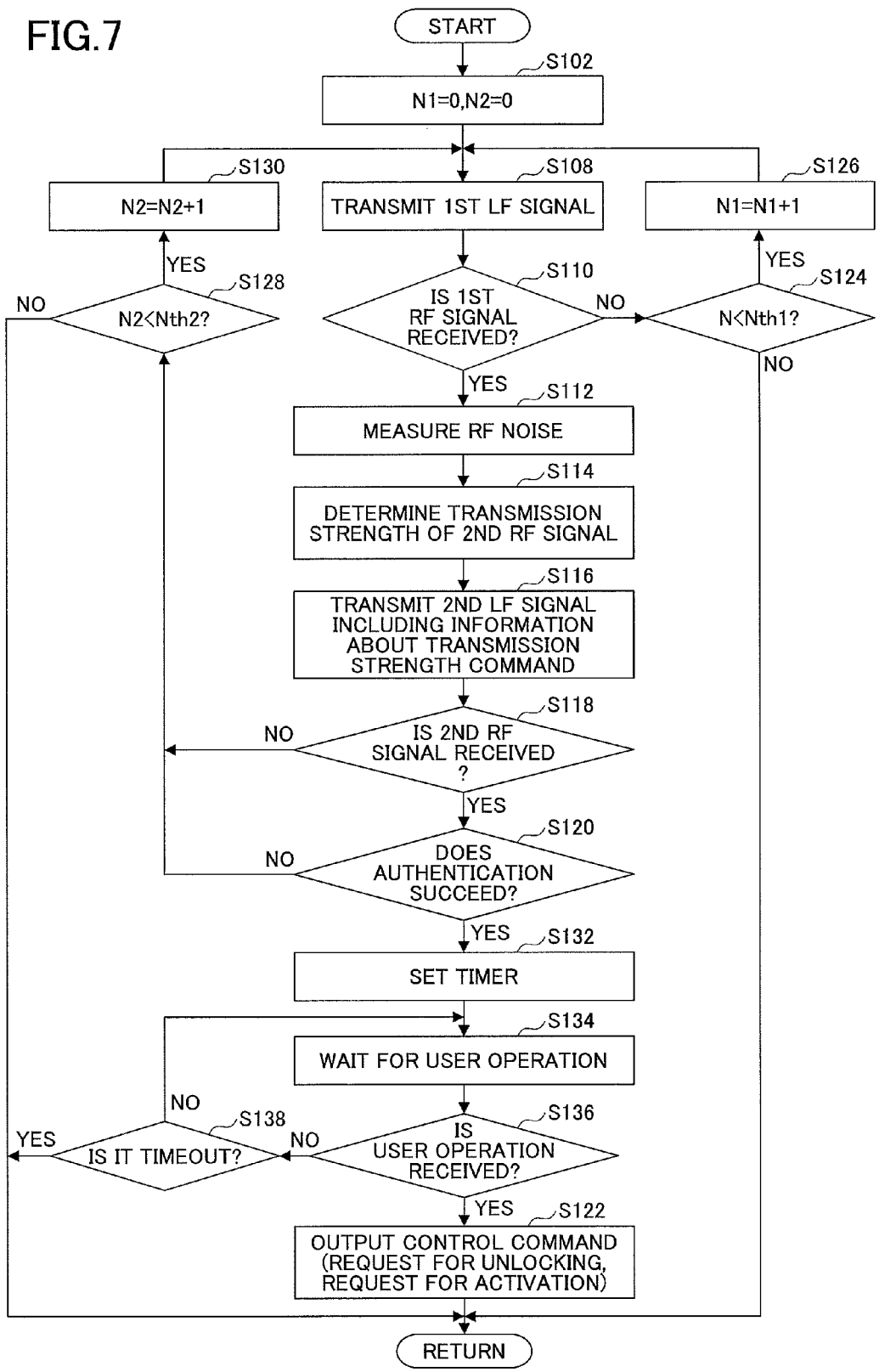
FIG. 7 is a flowchart schematically illustrating an example of a control process by an in-vehicle device according to the second embodiment.

FIG. 7 is a flowchart schematically illustrating an example of a control process by the in-vehicle device 10A according to the embodiment. The process by this flowchart is repeatedly executed at predetermined time intervals in a stop state of the vehicle 2 as in the first embodiment (see FIG. 4).

This flowchart omits Steps S104 and S106 in the flowchart in FIG. 4, and has Steps S132 to S138 added between Step S120 and Step S122. In the following, different parts will be mainly described.

At Step S120, the authentication unit 114 determines whether to authenticate the mobile device 20, based on the master information for authentication stored in the storage unit 116 in advance, and the information for authentication of transmission included in the second RF signal, which is similar to the first embodiment. The authentication unit 114 goes to Step S132 if authentication of the mobile device 20 succeeds, which is different from the first embodiment, or goes to Step S128 if authentication of the mobile device 20 does not succeed, which is similar to the first embodiment.

At Step S132, the transmission control ECU 11A sets a timer that will be timed out at the predetermined time T2.

Note that the predetermined time T2 is a time to wait for a predetermined operation by the user on the operation reception unit 110A as described above, and set to a time sufficiently shorter than an execution cycle of a process by this flowchart.

At Step S134, the operation reception unit 110A transitions to a state of waiting for a user operation.

At Step S136, the operation reception unit 110A determines whether a predetermined operation has been received. The operation reception unit 110A goes to Step S122 if a predetermined operation has been received; or goes to Step S138 if not having received.

At Step S122, the control unit 115A outputs a control command based on the predetermined operation received by the operation reception unit 110A at Step S136 (a request for unlocking or locking based on the smart entry function or a request for starting up the vehicle based on the keyless vehicle start-up function) to the ECU 30, and ends the current process.

On the other hand, at Step S138, the transmission control ECU 11A determines whether the timer has timed out. The transmission control ECU 11A goes back to Step S134 if the timer has not timed out, to repeat Steps S134 and S136 until the time-out; or ends the current process if timed out.

As such, the present embodiment is mainly different from the first embodiment, in that the in-vehicle device 10A (the LF signal transmission unit 111A) transmits the first LF signal at predetermined cycles; and if the authentication unit 114 has authenticated the mobile device 20, and the operation reception unit 110A has received a predetermined operation during a certain period after the reception, then, the control unit 115A outputs a control command (a request for unlocking and locking the doors, a request for starting up the vehicle, and the like). The rest of the process is substantially the same as in the first embodiment. In other words, the RF noise measurement unit 121 of the in-vehicle device 10A measures noise in the RF band; the transmission strength determination unit 112 of the in-vehicle device 10A determines the transmission strength of the second RF signal, based on a measurement result by the RF noise measurement unit 121, so as to make the transmission strength greater within a range lower than the predetermined strength A0 while the noise becomes greater; and the LF signal transmission unit 111A of the in-vehicle device 10A wirelessly transmits a second LF signal that includes command information to command the transmission strength determined by the RF signal strength determination unit 112, into the predetermined area. Then, the LF signal reception unit 210 of the mobile device 20 receives the second LF signal; the RF signal strength setting unit 213 of the mobile device 20 sets the transmission strength of a second RF signal based on the information about transmission strength command included in the second LF signal; and the RF signal transmission unit 211 of the mobile device 20 wirelessly transmits the second RF signal by the transmission strength set by the RF signal strength setting unit 213. Therefore, substantially the same operations and effects can be obtained in the present embodiment as in the first embodiment.

Also, as in the first embodiment, the transmission strength of a second RF signal can be set considering the reception strength of the first RF signal in the RF signal reception unit 120. Specifically, the RF signal strength determination unit 112 determines the transmission strength of the second RF signal, based on a measurement result of noise in the RF band by the RF noise measurement unit 121, and the reception strength of the first RF signal received by the RF signal reception unit 120, so as to make the transmission strength greater within a range lower than the predetermined strength A0, while the level of the noise in the RF band becomes greater, and while the reception strength of the first RF signal becomes lower. Therefore, the lower the reception strength of the first RF signal transmitted from the mobile device 20 (the RF signal transmission unit 211) becomes, the greater the transmission strength of the second RF signal is set, and hence, communication performance in a noisy environment can be secured more appropriately.

Note that as in the first embodiment, if the RF signal strength determination unit 112 does not take the reception strength of the first RF signal into consideration when determining the transmission strength of a second RF signal, the process may return to Step S112 after Step S130 in the flowchart in FIG. 7.

Third Embodiment

Next, a third embodiment will be described.

Figure 8:
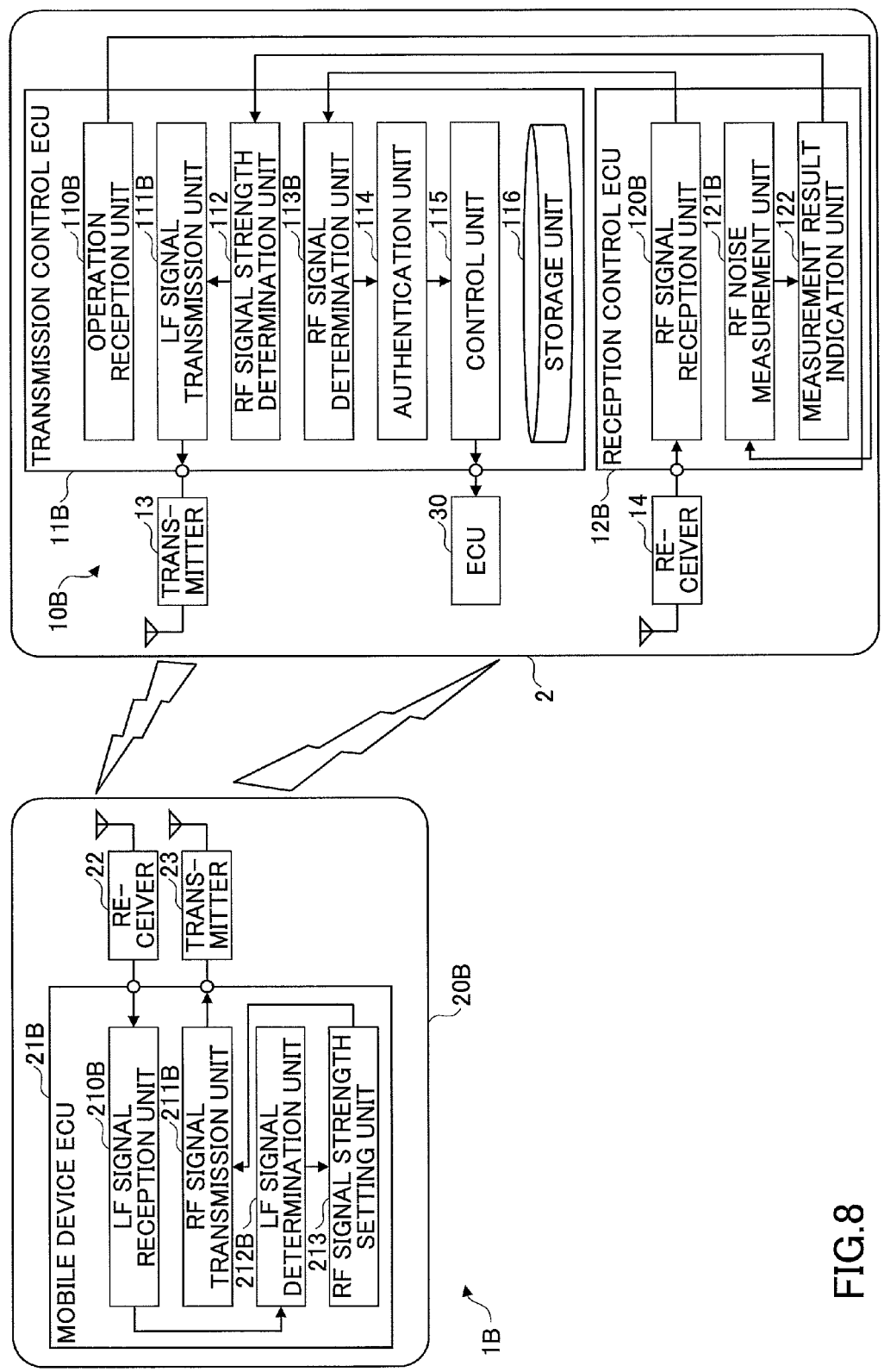
FIG. 8 is a configuration diagram schematically illustrating an example of a configuration of a smart key system according to a third embodiment.

FIG. 8 is a configuration diagram schematically illustrating an example of a configuration of a smart key system 1B according to the third embodiment.

The smart key system 1B according to the embodiment has an in-vehicle device 10B (a transmission control ECU 11B and a reception control ECU 12B) and a mobile device 20B (a mobile device ECU 21B), which replace the in-vehicle device 10 (the transmission control ECU 11 and the reception control ECU 12) and the mobile device 20 (the mobile device ECU 21), respectively, and make differences from the first embodiment. Specifically, the operation reception unit 110, the LF signal transmission unit 111, the RF signal determination unit 113, the RF signal reception unit 120, and the RF noise measurement unit 121 in the first embodiment are replaced by an operation reception unit 110B, an LF signal transmission unit 111B, an RF signal determination unit 113B, an RF signal reception unit 120B, and an RF noise measurement unit 121B, respectively. In the following, the same elements as in the first embodiment are assigned the same codes, and different parts will be mainly described.

If having received a predetermined operation, the operation reception unit 110B indicates to the RF noise measurement unit 121B that the predetermined operation has been received, which is different from the first embodiment.

The LF signal transmission unit 111B does not transmit a first LF signal (an example of a preceding response signal), but transmits only a second LF signal (an example of a main request signal), which is different from the first embodiment. Specifically, the LF signal transmission unit 111 executes a process for outputting a second LF signal that includes information about a transmission strength command commanding the transmission strength of a second RF signal (an example of a main response signal) determined by the RF signal strength determination unit 112 to the transmitter 13, and wirelessly transmitting the second LF signal into the predetermined area via the transmitter 13. The second LF signal in the present embodiment, which is different from the first embodiment, is a wake signal to wake up the mobile device 20B (the mobile device ECU 21B) that has been in a reception wait state, and also is a request signal (a main request signal) to request for transmission of a response signal (a second RF signal) that includes information for authentication of transmission to authenticates the mobile device 20B.

Note that the format of a second LF signal is the same as in the first embodiment (see FIG. 2).

The RF signal determination unit 113B determines whether the RF signal reception unit 120B has received a second RF signal, based on a reception result indicated by the RF signal reception unit 120B. The RF signal determination unit 113B indicates the determination result to the authentication unit 114.

The RF signal reception unit 120B executes a process for receiving a second RF signal transmitted from the mobile device 20B via the receiver 14. The RF signal reception unit 120B indicates the reception result of the second RF signal to the RF signal determination unit 113B of the transmission control ECU 11B.

The RF noise measurement unit 121B executes a process for measuring noise in the RF band if having received an indication that a predetermined operation has been received by the operation reception unit 110B. The RF noise measurement unit 121B indicates the measurement result (noise level) to the measurement result indication unit 122.

The LF signal reception unit 210B executes a process for receiving a second LF signal transmitted from the in-vehicle device 10B (the LF signal transmission unit 111B) via the receiver 22. The LF signal reception unit 210B indicates the reception result of the second LF signal to the LF signal determination unit 212B.

Note that if having received a second LF signal, the LF signal reception unit 210B executes a process for waking up the mobile device 20B (the mobile device ECU 21B) depending on the wake burst (see FIG. 2) of the second LF signal.

If the LF signal reception unit 210B has received a normal second LF signal (if the RF signal transmission unit 211B has received from the RF signal strength setting unit 213 an indication of a determination result that the LF signal reception unit 210B has received a normal second LF signal), the RF signal transmission unit 211B transmits a second RF signal by the transmission strength commanded by the information about transmission strength command included in the second LF signal (the transmission strength set by the RF signal strength setting unit 213, based on the information about transmission strength command) via the transmitter 23. The second RF signal is generated in an aspect that includes information for authentication of transmission, depending on the authentication command included in the second LF signal, which is similar to the first embodiment.

The LF signal determination unit 212B determines whether the LF signal reception unit 210B has received a second LF signal, based on a reception result indicated by the LF signal reception unit 210B. Also, if having determined that the LF signal reception unit 210B has received a second LF signal, the LF signal determination unit 212B compares an identification code specific to the in-vehicle device 10B included in the authentication command of the second LF signal, with an identification code stored in an internal memory or the like of the mobile device ECU 21B in advance, to determine whether the identification codes are the same. If having determined that the LF signal reception unit 210B has received a second LF signal, and having determined that the identification codes are the same, the LF signal determination unit 212B outputs a determination result that "a normal second LF signal" has been received; otherwise, outputs a determination result that "a normal second LF signal" has not been received. The LF signal determination unit 212B indicates the determination result to the RF signal strength setting unit 213.

Next, respective control processes in the in-vehicle device 10B and the mobile device 20B will be described with reference to FIG. 9 and FIG. 10.

Figure 9:
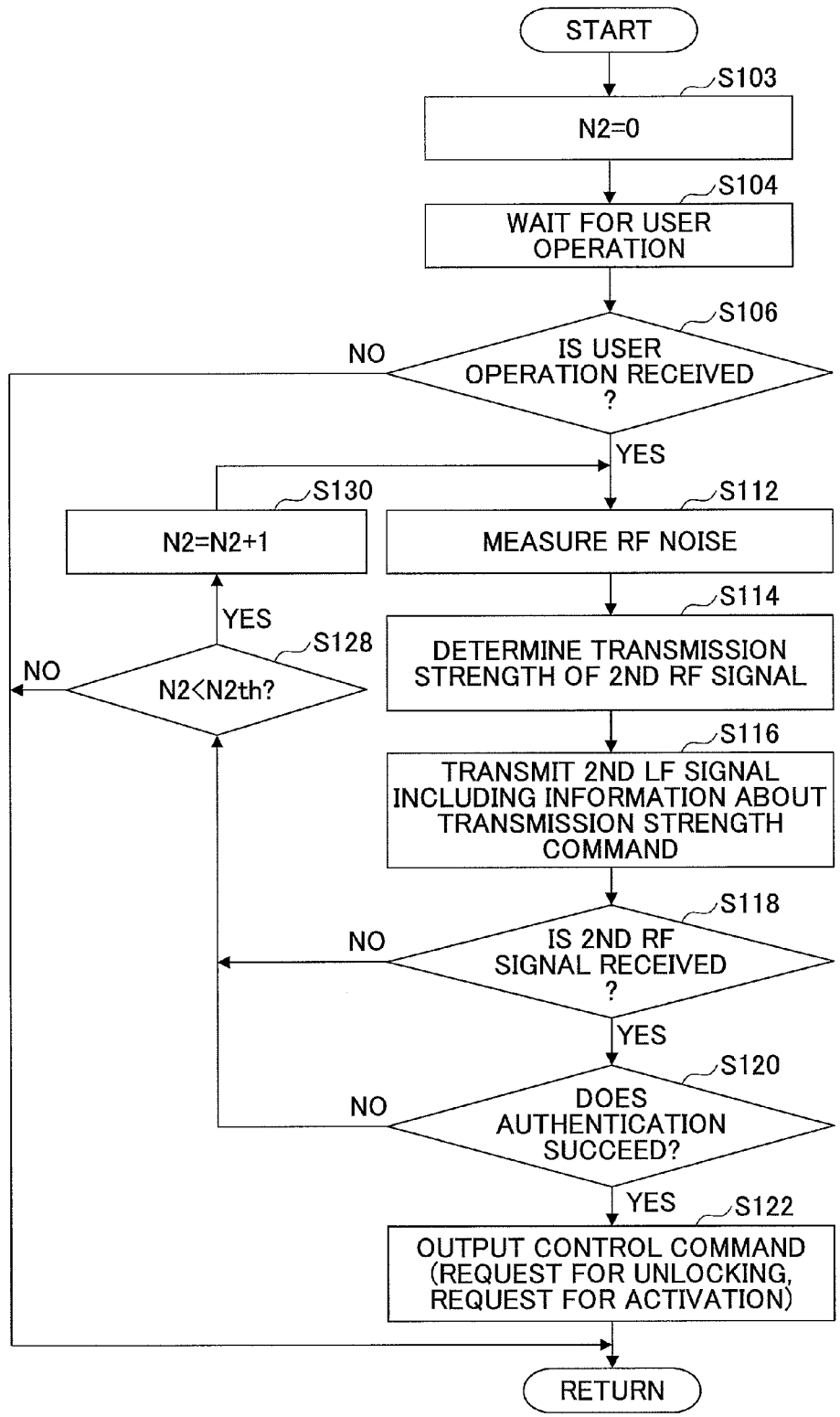
FIG. 9 is a flowchart schematically illustrating an example of a control process by an in-vehicle device according to the third embodiment.

FIG. 9 is a flowchart schematically illustrating an example of a control process by the in-vehicle device 10B according to the embodiment. The process by this flowchart is repeatedly executed at predetermined time intervals in a stop state of the vehicle 2, as in the first embodiment (see FIG. 4).

This flowchart has Step S103 that replaces Step S102 in the flowchart in FIG. 4, and omits Steps S110, S112, S124, and S126. In the following, different parts will be mainly described.

At Step S103, the transmission control ECU 11B sets the value of N2 to 0.

Step S104 is the same as in the first embodiment (see FIG. 4).

At Step S106, if the operation reception unit 110B determines that a predetermined operation has been received, then, at Step S112, the RF noise measurement unit 121B measures noise in the RF band, and the measurement result indication unit 122 indicates the measurement result to the RF signal strength determination unit 112.

Steps S112 to S122, S128, and S130 are the same as in the first embodiment (see FIG. 4).

Figure 10:
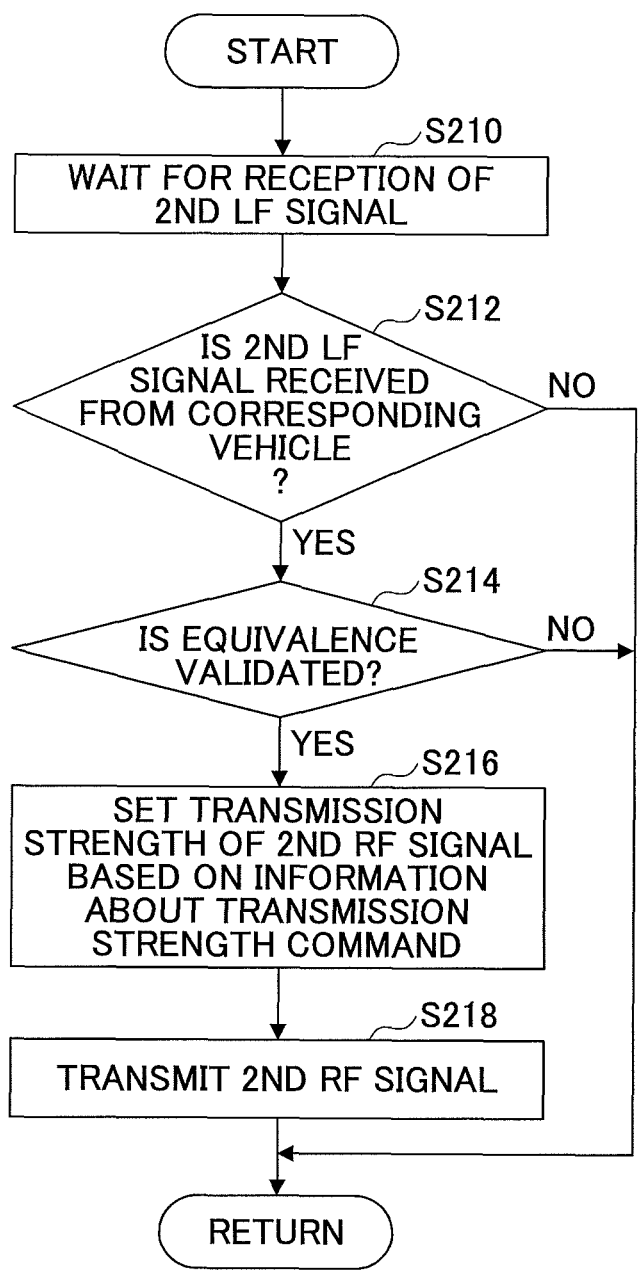
FIG. 10 is a flowchart schematically illustrating an example of a control process by a mobile device according to the third embodiment.

Next, FIG. 10 is a flowchart schematically illustrating an example of a control process by the mobile device 20 according to the embodiment. The process by this flowchart is repeatedly executed at predetermined time intervals as in the first embodiment (see FIG. 5).

This flowchart omits Steps S202 to S208, and S220 in the flowchart in FIG. 5. Therefore, further description is omitted.

As such, the present embodiment is mainly different from the first embodiment, in that transmission of the first LF signal from the in-vehicle device 10B (the LF signal transmission unit 111B), and transmission of the first RF signal from the mobile device 20B (the RF signal transmission unit 211B) are omitted; and the second LF signal from the in-vehicle device 10B (the LF signal transmission unit 111B) also works as a wake signal (the function to have the mobile device 20B transition to a wake state). The rest of the process is substantially the same as in the first embodiment. In other words, the RF noise measurement unit 121B of the in-vehicle device 10B measures noise in the RF band; the transmission strength determination unit 112 of the in-vehicle device 10B determines the transmission strength of the second RF signal, based on a measurement result by the RF noise measurement unit 121B, so as to make the transmission strength greater within a range lower than the predetermined strength A0 while the noise becomes greater; and the LF signal transmission unit 111B of the in-vehicle device 10B wirelessly transmits a second LF signal that includes command information to command the transmission strength determined by the RF signal strength determination unit 112, into the predetermined area. Then, the LF signal reception unit 210B of the mobile device 20B receives the second LF signal; the RF signal strength setting unit 213 of the mobile device 20B sets the transmission strength of a second RF signal based on the information about transmission strength command included in the second LF signal; and the RF signal transmission unit 211B of the mobile device 20B wirelessly transmits the second RF signal by the transmission strength set by the RF signal strength setting unit 213. Therefore, substantially the same operations and effects can be obtained in the present embodiment as in the first embodiment.

Fourth Embodiment

Next, a fourth embodiment will be described.

Figure 11:
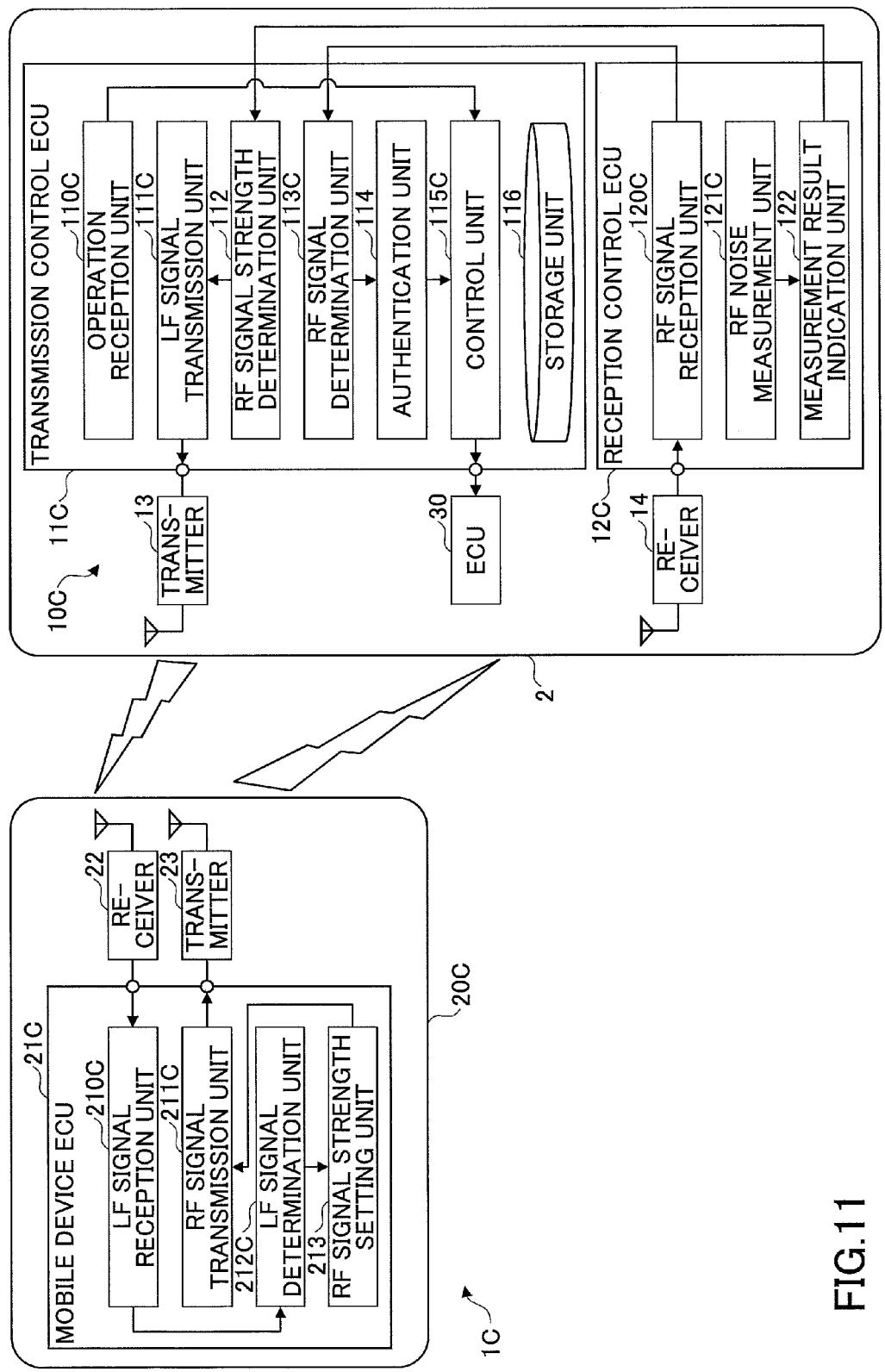
FIG. 11 is a configuration diagram schematically illustrating an example of a configuration of a smart key system according to a fourth embodiment.

FIG. 11 is a configuration diagram schematically illustrating an example of a configuration of a smart key system 1C according to the fourth embodiment.

The smart key system 10 according to the fourth embodiment has an in-vehicle device 100 (a transmission control ECU 11C and a reception control ECU 12C) and a mobile device 20C (a mobile device ECU 21C), which replace the in-vehicle device 10 (the transmission control ECU 11 and the reception control ECU 12) and the mobile device 20 (the mobile device ECU 21), respectively, and make differences from the first embodiment. Specifically, the operation reception unit 110, the LF signal transmission unit 111, the RF signal determination unit 113, the control unit 115, the RF signal reception unit 120, and the RF noise measurement unit 121 in the first embodiment are replaced by an operation reception unit 110C, an LF signal transmission unit 111C, an RF signal determination unit 113C, a control unit 115C, an RF signal reception unit 120C, and an RF noise measurement unit 121C, respectively. Also, the LF signal reception unit 210, the RF signal transmission unit 211, and the LF signal determination unit 212 in the first embodiment are replaced by an LF signal reception unit 210C, an RF signal transmission unit 211C, and an LF signal determination unit 212C, respectively. In the following, the same elements as in the first embodiment are assigned the same codes, and different parts will be mainly described.

If having received a predetermined operation, the operation reception unit 110C indicates to the control unit 115C that the predetermined operation has been received, as in the second embodiment.

The LF signal transmission unit 111C does not transmit a first LF signal (an example of a preceding response signal), but transmits only a second LF signal (an example of a main request signal), as in the third embodiment. Also, the LF signal transmission unit 111C executes a process for outputting a second LF signal to the transmitter 13, and wirelessly transmitting the signal via the transmitter 13 into the predetermined area at predetermined cycles. Specifically, the LF signal transmission unit 111C executes a process for outputting a second LF signal that includes information about a transmission strength command commanding the transmission strength of a second RF signal (an example of a main response signal) determined by the RF signal strength determination unit 112 to the transmitter 13, and wirelessly transmitting the second LF signal into the predetermined area via the transmitter 13. The second LF signal in the present embodiment is a wake signal to wake up the mobile device 20C (the mobile device ECU 21C) that has been in a reception wait state, and is a request signal (a main request signal) to request for transmission of a response signal (a second RF signal) that includes information for authentication of transmission to authenticates the mobile device 20C, which is similar to the third embodiment.

Note that the format of a second LF signal is the same as in the first embodiment (see FIG. 2).

The RF signal determination unit 113C determines whether the RF signal reception unit 120C has received a second RF signal, based on a reception result indicated by the RF signal reception unit 120C. The RF signal determination unit 113C indicates the determination result to the authentication unit 114.

As in the second embodiment, if the authentication unit 114 has authenticated the mobile device 20C, and the control unit 115C receives from the operation reception unit 110C, within the predetermined time T2 after the reception, an indication that the predetermined operation has been received, then, the control unit 115C outputs a control command based on the predetermined operation (a request for unlocking and locking the doors, a request for starting up the vehicle, and the like) to the ECU 30. In other words, if the authentication unit 114 has authenticated the mobile device 20C and the operation reception unit 110C has received the predetermined operation, the control unit 115C outputs the control command to the ECU 30.

The RF signal reception unit 120C executes a process for receiving the second RF signal transmitted from the mobile device 20C via the receiver 14. The RF signal reception unit 120C indicates the reception result of the second RF signal to the RF signal determination unit 113C of the transmission control ECU 11C.

The RF noise measurement unit 121C executes a process for measuring noise in the RF band at predetermined cycles in response to the second LF signal wirelessly transmitted at the predetermined cycles. The RF noise measurement unit 121C indicates the measurement result (noise level) to the measurement result indication unit 122.

The LF signal reception unit 210C executes a process for receiving the second LF signal transmitted from the in-vehicle device 100 (the LF signal transmission unit 111C) via the receiver 22. The LF signal reception unit 210C indicates the reception result of the second LF signal to the LF signal determination unit 212C.

Note that as in the third embodiment, if having received the second LF signal, the LF signal reception unit 210C executes a process for waking up the mobile device 20C (the mobile device ECU 21C) depending on the wake burst (see FIG. 2) of the second LF signal.

If the LF signal reception unit 210C has received a normal second LF signal (if the RF signal transmission unit 211C has received from the RF signal strength setting unit 213 an indication of a determination result that the LF signal reception unit 210C has received a normal second LF signal), the RF signal transmission unit 211C transmits the second RF signal by the transmission strength commanded by the information about transmission strength command included in the second LF signal (the transmission strength set by the RF signal strength setting unit 213, based on the information about transmission strength command) via the transmitter 23. The second RF signal is generated in an aspect that includes information for authentication of transmission depending on the authentication command included in the second LF signal, as in the first embodiment.

The LF signal determination unit 212C determines whether the LF signal reception unit 210C has received the second LF signal, based on a reception result indicated by the LF signal reception unit 210C. Also, if having determined that the LF signal reception unit 210C has received the second LF signal, the LF signal determination unit 212C compares an identification code specific to the in-vehicle device 100 included in the authentication command of the second LF signal, with an identification code stored in an internal memory or the like of the mobile device ECU 21C in advance, to determine whether the identification codes are the same. If having determined that the LF signal reception unit 210C has received the second LF signal, and having determined that the identification codes are the same, the LF signal determination unit 212C outputs a determination result that "a normal second LF signal" has been received; otherwise, outputs a determination result that "a normal second LF signal" has not been received. The LF signal determination unit 212C indicates the determination result to the RF signal strength setting unit 213.

Next, a control process in the in-vehicle device 100 will be described with reference to FIG. 12.

Note that a control process in the mobile device 20C is the same as in the third embodiment, and the description is omitted.

Figure 12:
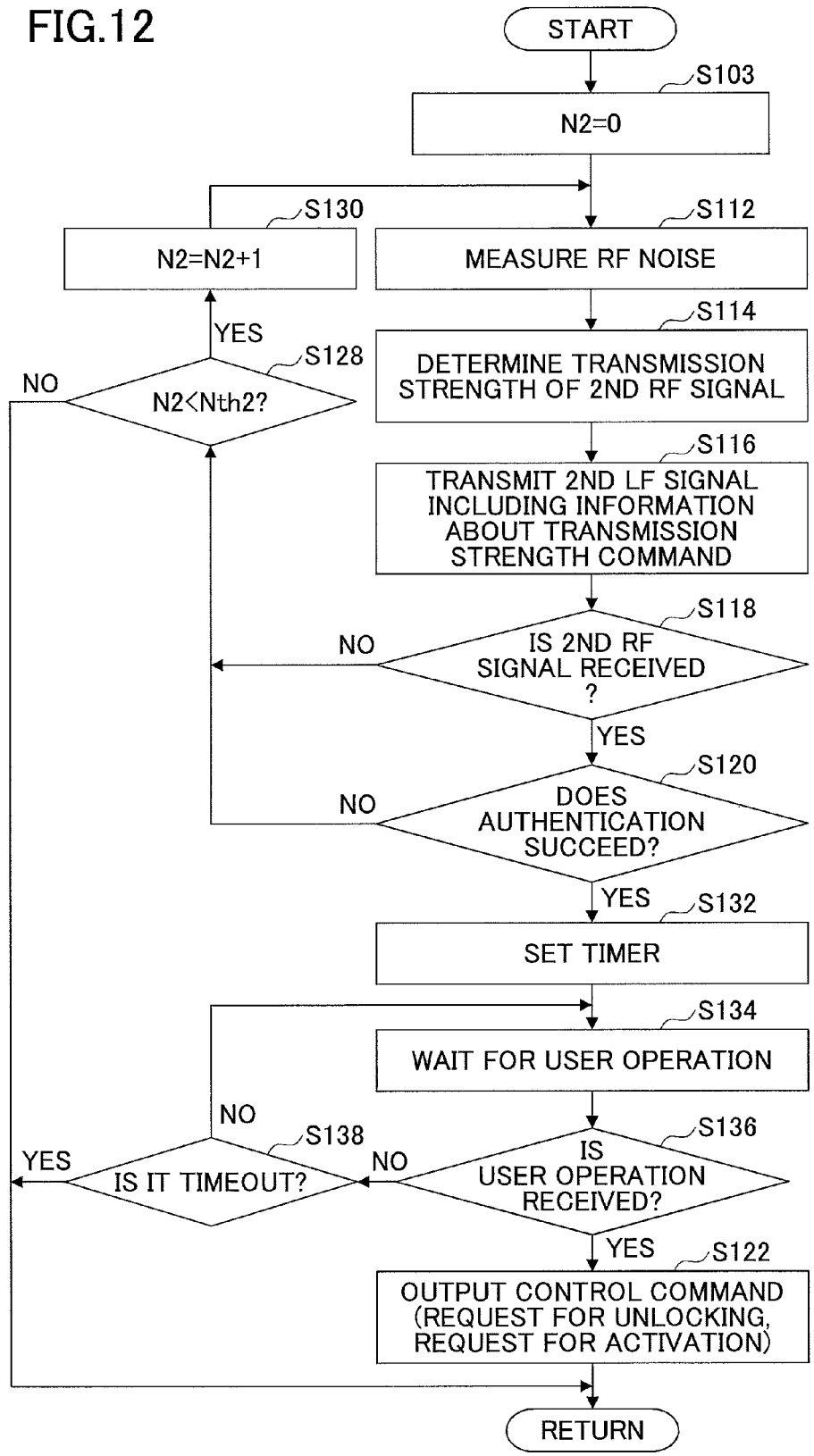
FIG. 12 is a flowchart schematically illustrating an example of a control process by an in-vehicle device according to the fourth embodiment.

FIG. 12 is a flowchart schematically illustrating an example of a control process by the in-vehicle device 100 according to the embodiment. The process by this flowchart is repeatedly executed at predetermined time intervals in a stop state of the vehicle 2 as in the first embodiment (see FIG. 4).

This flowchart has Step S103 that replaces Step S102 in the flowchart in FIG. 4 as in the third embodiment, omits Steps S104 and S106 in the flowchart in FIG. 4, and has Steps S132 to S138 added between Step S120 and Step S122 as in the second embodiment. In the following, different parts will be mainly described.

At Step S103, the transmission control ECU 11 sets the value of N2 to 0 as in the third embodiment.

Steps S112 to S118 are the same as in the first embodiment (see FIG. 4).

At Step S120, as in the first embodiment, the authentication unit 114 determines whether to authenticate the mobile device 20, based on the master information for authentication stored in the storage unit 116 in advance and the information for authentication of transmission included in the second RF signal. The authentication unit 114 goes to Step S132 if authentication of the mobile device 20 succeeds, which is similar to the second embodiment; or goes to Step S128 if authentication of the mobile device 20 does not succeed, which is similar to the first embodiment.

At Step S132, as in the second embodiment, the transmission control ECU 11C sets a timer that will be timed out at the predetermined time T2.

At Step S134, as in the second embodiment, the transmission control ECU 11C transitions to a state of waiting for a user operation.

At Step S136, as in the second embodiment, the operation reception unit 110C determines whether a predetermined operation has been received. The operation reception unit 110C goes to Step S122 if a predetermined operation has been received; or goes to Step S138 if not having received.

At Step S122, as in the second embodiment, the control unit 115C outputs a control command based on the predetermined operation received by the operation reception unit 110C at Step S136 (a request for unlocking or locking based on the smart entry function, or a request for starting up the vehicle based on the keyless vehicle start-up function) to the ECU 30, and ends the current process.

On the other hand, at Step S138, as in the second embodiment, the transmission control ECU 11C determines whether the timer has timed out. The transmission control ECU 11C goes back to Step S134 if the timer has not timed out, to repeat Steps S134 and S136 until the time-out.

As such, the present embodiment is mainly different from the first embodiment, in that transmission of the first LF signal from the in-vehicle device 10C (the LF signal transmission unit 111C), and transmission of the first RF signal from the mobile device 20C (the RF signal transmission unit 211C) are omitted; the in-vehicle device 10C (the LF signal transmission unit 111C) transmits the first LF signal at predetermined cycles; and if the authentication unit 114 has authenticated the mobile device 20C, and the operation reception unit 110C has received a predetermined operation during a certain period after the reception, then, the control unit 115C outputs a control command (a request for unlocking and locking the doors, a request for starting up the vehicle, and the like). The rest of the process is substantially the same as in the first embodiment. In other words, the RF noise measurement unit 121C of the in-vehicle device 10C measures noise in the RF band; the transmission strength determination unit 112 of the in-vehicle device 10C determines the transmission strength of the second RF signal, based on a measurement result by the RF noise measurement unit 121C, so as to make the transmission strength greater within a range lower than the predetermined strength A0 while the noise becomes greater; and the LF signal transmission unit 111C of the in-vehicle device 100 wirelessly transmits a second LF signal that includes command information to command the transmission strength determined by the RF signal strength determination unit 112, into the predetermined area. Then, the LF signal reception unit 210C of the mobile device 20C receives the second LF signal; the RF signal strength setting unit 213 of the mobile device 20C sets the transmission strength of a second RF signal based on the information about transmission strength command included in the second LF signal; and the RF signal transmission unit 211C of the mobile device 20C wirelessly transmits the second RF signal by the transmission strength set by the RF signal strength setting unit 213. Therefore, substantially the same operations and effects can be obtained in the present embodiment as in the first embodiment.

So far, the embodiments of the present invention have been described in detail. Note that the present invention is not limited to the above specific embodiments, but various modifications and changes could be made within the scope of the present invention described by the claims.

The present application is based on and claims the benefit of priority of Japanese Priority Application No. 2015-183347, filed on Sep. 16, 2015, the entire contents of which are hereby incorporated by reference.

The invention claimed is:

1. A smart key system, comprising:
   an in-vehicle device configured to be installed in a vehicle;
   a transmitter configured to be capable of outputting a radio wave by a predetermined strength; and
   a mobile device configured to be capable of communicating wirelessly with the in-vehicle device,
   wherein the in-vehicle device includes
   at least one control electronic control unit (ECU) configured to act as:
      an operation reception unit configured to receive a predetermined operation;
   the at least one control ECU including a memory configured to store first information for authentication for the mobile device that has been preregistered,
   the at least one control ECU further configured to acts as:
      a noise measurement unit configured to measure noise in a radio wave band of a main response signal to be wirelessly transmitted by the mobile device;
      a transmission strength determination unit configured to determine a transmission strength of the main response signal, based on a measurement result by the noise measurement unit, so as to make the transmission strength greater within a range lower than the predetermined strength while the noise becomes greater;
      a first transmitter unit configured to wirelessly transmit a main request signal that includes command information to command the transmission strength determined by the transmission strength determination unit, into a predetermined area;
      a first receiver unit configured to receive the main response signal;
      an authentication unit configured to authenticate the mobile device, based on the first information for authentication stored in the storage unit, and second information for authentication included in the main response signal; and
      a control unit configured to control executing at least one of unlocking the vehicle and starting up the vehicle, in a case where the operation reception unit has received the predetermined operation, and the authentication unit has authenticated the mobile device,
   wherein the mobile device includes
   a mobile device ECU configured to acts as:
      a second receiver unit configured to receive the main request signal;
      a transmission strength setting unit configured to set the transmission strength of the main response signal, based on the command information included in the main request signal; and
      a second transmitter unit configured to wirelessly transmit the main response signal that includes the second information for authentication by the transmission strength set by the transmission strength setting unit, in a case where the second receiver unit has received the main request signal.

2. The smart key system as claimed in claim 1, wherein the control ECU acting as:
   the first transmitter unit wirelessly transmits a preceding request signal into the predetermined area before transmitting the main request signal,
   the second receiver unit receives the preceding request signal,
   the second transmitter unit wirelessly transmits a preceding response signal by the predetermined strength, in a case where the second receiver unit has received the preceding request signal,
   the first receiver unit receives the preceding response signal,
   the noise measurement unit measures the noise in a case where the first receiver unit has received the preceding response signal, and
   the transmission strength determination unit determines the transmission strength of the main response signal, based on the measurement result by the noise measurement unit, and a reception strength of the preceding response signal received by the first receiver unit, so as to make the transmission strength of the main response signal greater within the range lower than the predetermined strength, while the noise becomes greater and while the reception strength becomes lower.

* * * * *